United States Patent [19]

Willard et al.

[11] Patent Number: 4,889,733

[45] Date of Patent: Dec. 26, 1989

[54] METHOD FOR CONTROLLING PUFFING OF A SNACK FOOD PRODUCT

[76] Inventors: Miles J. Willard, 229 N. Lloyd Cir., Idaho Falls, Id. 83402; Kyle E. Dayley, Rte. 4, Box 4548, Rigby, Id. 83442; Veldon M. Hix, 1371 Fairmont Dr.; David A. Holm, Rte. 6, Box 263, both of Idaho Falls, Id. 83401

[21] Appl. No.: 282,936

[22] Filed: Dec. 8, 1988

Related U.S. Application Data

[60] Continuation of Ser. No. 905,978, Sep. 10, 1986, abandoned, which is a division of Ser. No. 826,233, Feb. 5, 1986, Pat. No. 4,650,687, which is a continuation-in-part of Ser. No. 700,696, Feb. 12, 1985, abandoned.

[51] Int. Cl.$^4$ ............................................. A23L 1/217
[52] U.S. Cl. ..................................... 426/438; 426/439; 426/808

[58] Field of Search ............... 426/143, 383, 438, 439, 426/144, 496, 808, 440; 425/290; 99/404, 405, 406

[56] References Cited

U.S. PATENT DOCUMENTS

| | | | |
|---|---|---|---|
| 2,905,559 | 9/1959 | Anderson et al. | 426/439 |
| 3,278,311 | 10/1966 | Brown et al. | 426/439 X |
| 3,880,069 | 4/1975 | Moline | 99/483 |
| 4,170,659 | 10/1979 | Totino et al. | 426/439 X |
| 4,395,216 | 7/1983 | Anetsberger et al. | 425/290 |

*Primary Examiner*—Arthur L. Corbin
*Attorney, Agent, or Firm*—Hopkins French Crockett Springer & Hoopes

[57] ABSTRACT

Dough pieces are dockered by a rotating flexible bristle brush to form dockering holes in the dough to prevent puffing during frying. The flexible bristles increase the point density of dockering holes in the dough while avoiding sticking or wrinkling of the dough during the dockering step.

20 Claims, 4 Drawing Sheets

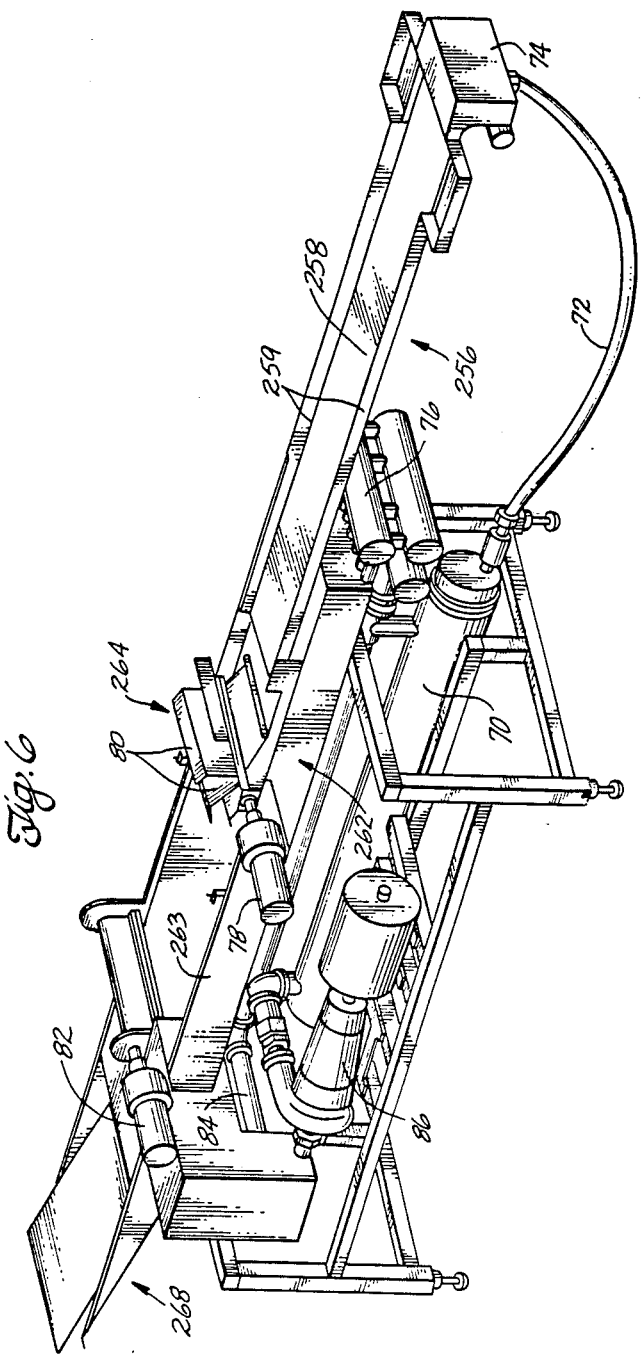

METHOD FOR CONTROLLING PUFFING OF A SNACK FOOD PRODUCT

CROSS-REFERENCE TO RELATED APPLICATIONS

This is a continuation of application Ser. No. 905,978 filed 09/10/86, now abandoned, which is a division of application Ser. No. 826,233 filed Feb. 5, 1986, now U.S. Pat. No. 4,659,687, which is a continuation-in-part of application Ser. No. 700,696, filed Feb. 12, 1985, now abandoned.

FIELD OF THE INVENTION

This invention relates to snack products, and more particularly to a method for controlling the shape of fried snack products In one embodiment of the invention, novel sheeted snack products are fried to form products of a similar curved shape with an appearance as if the products as a group were made at random. The novel shapes are imparted to the products irrespective of their overall size and without contact from mechanical shaping devices during frying. A preferred fried snack product is made from two adherent sheets of dissimilar potato-based dough controlled during frying to produce novel potato snacks resembling curved sections of a baked potato. These fried snack products are referred to herein as "potato skin snacks". Another embodiment of the invention relates to use of a flexible bristle dockering brush for perforating the dough before frying to prevent distortion such as puffing when the dough pieces are fried.

BACKGROUND OF THE INVENTION

Snack products of thin, relatively flat shape have unique advantages in processing and marketing as a consumer product. Potato chips, for example, are well-known snack products prepared by frying thin slices of raw fresh potatoes. Because of their thin dimension, water is rapidly removed from the potato slices during frying, forming a snack product with crisp texture and a fresh potato flavor. Extruded and sheeted fried snack products made in a thin, flat shape from ground precooked corn have the same advantages of fast frying to an acceptably low moisture content and a crisp texture.

Many processes have been developed for producing thin fried snack products from a dough which is prepared, formed and cut into desired shapes, and then fried. An especially large number of processes have produced such fried snacks from a potato-based dough, but none has had the commercial success of fresh potato chips. A number of these potato-based processes are described in my U.S. Pat. No. 3,886,291, from column 1, line 35 to column 3, line 23.

Generally, processes for frying dough pieces that have been sheeted and cut into desired shapes can be separated into two categories. The most common of these processes involves deep fat frying the dough pieces without mechanically shaping them during frying, resulting in products that are randomly shaped. The shape can be controlled only to a limited degree in the fryer by the stiffness of the dough pieces and the velocity of the frying oil. Large stiff dough pieces that fry to a relatively flat shape without curving are often considered undesirable because they stack together in packages, increasing the bulk density and presenting a generally unattractive appearance.

The second category of fried snack products made from thin, flat dough pieces includes those in which the dough piece is mechanically shaped during frying. In U.S. Pat. 3,132,949 to Crowe, flat sheeted cut pieces of a cornbased dough are fried; and as the pieces rise in the fryer due to accumulation of steam on the underside of the pieces, they are constrained by the curved shaped of a wire cloth suspended under the surface of the oil. This causes the shape of the pieces to conform to the curvature of the wire cloth. In U.S. Pat. No. 3,149,978 to Anderson et al., round corn chips are subjected to a mechanical force during deep fat frying, while the chips are sufficiently plastic. This imparts a bent configuration to the finished chips. In U.S. Pat. No. 3,394,646 to Cunningham et al., round discs are formed from corn masa by the concave configuration of a cupped surface that forms the dough piece. In U.S. Pat. No. 3,653,335 to Griner et al., dough pieces are shaped into a scoop portion and finger-grip portion by a complex mechanical forming machine. U.S. Pat. No. 3,966,983 to Dexter et al. describes maintaining thinly cut dough strips in a straight configuration by spraying oil on the product while it rests on a supporting belt before entering the fryer.

A number of fabricated potato chip processes use perforated metal forming devices to hold dough pieces during frying to form uniformly shaped chip-type products These processes are described, for example, in U.S. Pat. No. 3,520,248 to MacKendrick, and U.S. Pat. Nos. 3,576,647; 3,608,474; 3,626,466; and 3,998,975 to Liepa.

In another process for making fabricated potato chips, a dough sheet is cut into a continuous ribbon of dough pieces passed through a deep fat fryer and later broken into individual chips. This process is described in U.S. Pat. No. 3,937,848 to Campbell et al. and U.S. Pat. Nos. 4,032,664 and 4,096,791 to Weiss et al.

When making fried snacks from thin, flat dough pieces, there is a tendency for the dough piece surfaces to separate and puff during frying. In snack products made from a dough with a reasonably high moisture content, say in the 35% to 60% range, it is desirable to produce a thin, uniformly expanded product upon frying. Normally frying such a thin moist dough piece produces large surface bubbles in the fried product. Such puffing or bubbling occurs because steam accumulates between the outer surfaces of the dough pieces during frying, especially in sheeted dough pieces when multiple reduction rolls have been used. Puffing and bubbling detract from the appearance of the finished snack and can cause the snack to fill with excess fat. Such separation or distortion of dough pieces in the fryer has also been referred to in the art as "pillowing" or "blistering", but the terms puffing or bubbling are used interchangeably herein for convenience to describe any of these phenomena.

A number of processing techniques have been devoted to reducing puffing in thin sheeted fried snacks. U.S. Pat. No. 2,905,559 to Anderson et al. describes a conventional "dockering" technique in which a corn masa dough sheet is perforated with small rigid spikes spaced about ⅛ to ½ inch apart. The perforations allow moisture from the dough to escape during frying, which avoids puffing of the finished fried product. U.S. Pat. No. 3,278,311 to Brown et al. discloses a process for making corn chips in which corn particles are forced through a plasticizer having a screw grinder with a perforated end plate. The plasticized dough is sheeted and then dockered, cut into pieces and fried in oil. U.S.

Pat. No. 2,916,378 to Kunce et al. relies on coarsely ground corn in ordinary corn chips so that the dough surface is disconnected and the steam from within the dough can readily escape during frying to avoid puffing. U.S. Pat. No. 3,883,671 to Shatilla describes a process for reducing puffing by moistening the surfaces of flat dough pieces with water after forming and before frying. Other methods reported to reduce puffing include forming dough pieces with a corrugated surface, and forming the dough pieces in very thin layers of about 0.4 mm (0.016 in.) thickness.

It would be desirable to produce fried snacks with good flavor and a controlled curved shape from thin, flat dough pieces fried in a commercial process that does not require mechanical shaping of the dough pieces during frying, while avoiding puffing and excess fat uptake during frying. There are many difficulties to be encountered in producing such a product.

Flat dough pieces allowed to fry without mechanical constraints generally remain flat but can become randomly bent and have an unattractive appearance. The flat products have an undesirable high bulk density.

Fried snack products, particularly fabricated potato chips, which are made from flat formed dough pieces with mechanical constraints require complex and expensive forming equipment and nonconventional fryers. Further, because of the need to reduce volume in such fryers in order to avoid formation of free fatty acids, the frying time is commonly very short. It can be under 30 seconds, for example. This, in turn, limits the maximum initial water content of the dough to about 35%. Such a dry dough is difficult to form and produces a bland, unnatural flavor when fried. It is thought that typical potato flavor is absent from such products because flavor precursors present in the dry potato ingredients are not sufficiently hydrated and do not have time to react during the short frying interval to produce a characteristic fried potato flavor.

Processes in which dough pieces are mechanically constrained during frying normally produce fried products having an entirely uniform shape, and as a result, they appear artificial.

Attempts to reduce puffing in thin, flat fried snack products by mechanical dockering with rigid metal pins supported on cylindrical rollers have generally not been successful because the relatively large openings formed in the dough create an untypical appearance in the finished snack product. The products appear artificial because the large dockering holes have an identical pattern or a uniform repeat pattern in all of the finished snacks.

Attempts to control puffing by spraying water on the dough pieces can cause the pieces to become slippery and stick together during frying. Water spraying also requires more energy for subsequently removing the added water; and it forms a product with a hard, less desirable texture after frying.

The present invention provides a process for making a fried snack product from dough pieces fried so that their shape is controlled during frying to produce finished fried pieces of similar shape. Rather than being entirely uniformly shaped, the fried pieces appear as if made at random, in a manner similar to the random appearance of potato chips. The shape of the fried products is produced without use of mechanical molding or constraining devices during frying. Moreover, the fried snacks are produced from a dough having a relatively high moisture content. As a result, a frying time of 30 seconds or longer, preferably 60 seconds, can be used to prepare products which, when fried to completion, have a full characteristic fried flavor.

The invention includes a method for producing a novel two-layer fried snack product having a convexly curved shape which, in one embodiment, has an outer layer resembling the skin of a baked potato and an inner layer resembling the interior portion of a baked potato. These novel products are made from thin, flat layered dough pieces fried in oil without mechanical forming or constraints for shaping the dough pieces. During frying, a natural-appearing curved shape is imparted to the layered dough pieces. One embodiment of the invention controls the dough pieces during frying so that layers resembling the darker skin of a baked potato are consistently on the convexly curved outer sides of the finished products, while the layers resembling the lighter interior portion of a baked potato are on the concavely curved insides of the finished products.

The invention also provides novel dockering techniques that produce single layer and double layer finished products without undesired puffing or bubbling, while avoiding water spraying and problems associated with dockering rolls having rigid metal pins. The dockering method also avoids other problems resulting from dockering techniques of the prior art. In addition, use of the dockering method produces novel fried products.

SUMMARY OF THE INVENTION

Briefly, one embodiment of this invention comprises a method for making a fried snack product from thin dough pieces introduced into a flow of frying oil maintained at a shallow depth within a fryer. The dough pieces float freely in the shallow depth of oil while frying to form a controlled curved shape. The shallow depth of the oil in relation to the size of the dough pieces prevents the freely floating pieces from overturning in the oil while frying to form the controlled curved shape. The flow of cooking oil within the shallow depth portion of the fryer is controlled so that the pieces are conveyed smoothly along the fryer without significant interference or contact or turbulence in the oil flow that would disrupt shaping of the pieces or prevent the pieces from frying for a controlled frying time within the shallow depth of oil. The pieces are fried for a length of time sufficient to evaporate an amount of moisture from the fried pieces to set the pieces in the desired curved shape. Frying then can be continued until the pieces are fried to completion, and then the finished pieces are removed from the oil.

Another embodiment of the invention is a novel two-layer fried snack product made from thin layered dough pieces each having a light colored dough layer sheeted as a separate first layer, and a second dough layer of a darker color or of dissimilar composition sheeted as a second layer on top of the first layer. The layered dough is cut into pieces which are introduced into the shallow depth of frying oil so that the first layer of the dough pieces is at the bottom and the second layer is uppermost in the fryer. The layered dough pieces naturally assume a convexly curved shape while floating freely and frying in the shallow depth of oil. The oil depth within this section of the fryer in relation to the size of the dough pieces is sufficiently shallow to prevent the pieces from overturning while frying. This produces fried products with a convexly curved outer layer formed by the second dough layer and a concavely curved inner layer formed by the first dough layer. In one embodiment, the first and second dough layers are made from a potato-based dough in which the first layer is a light uniformly colored dough resembling the inner portion of a baked potato skin. Techniques also are disclosed for imparting to the second layer a natural-appearing mottled baked potato skin-simulating layer. Portions of the first and second dough layers, removed as unused dough in the cutting step, can be mixed into the dough material contained in the darker second dough layer for forming striations of lighter colored dough that produce a mottled natural appearance in the convexly curved darker layer of the finished fried product.

Thus, the process of this invention produces relatively thin, non-puffed fried snack products from thin, flat dough pieces which naturally form a convexly curved shape during frying. The shape is formed without use of mechanical constraints or other physical shaping devices in physical contact with the pieces during the initial stages of frying when the shape of the product is being formed. An important advantage of the process is the ability to produce fried snack products having similar, but not uniform convexly curved shapes with an appearance as if the products were made at random. The process can be practiced to produce a bi-layered potato snack resembling a fried potato skin having a darker mottled natural-appearing outer layer resembling a natural potato skin and a lighter colored inner layer resembling the interior of the potato. These products can be produced in an elongated oval shape and curvature that resembles sections cut from baked potatoes.

The dough may be prepared from any of the various starchy food materials normally used for making fried snack products, including dried potatoes such as potato flakes, potato granules and the like; partially cooked ground corn, with or without lime treatment, otherwise known as corn "masa"; other cereal flours such as those made from wheat, rice or oats; and combinations of these ingredients. The dough prepared from dehydrated potatoes can include mixtures of potato flakes, potato granules and potato starch as described in my U.S. Pat. No. 3,886,291. This is a preferred approach. The dough also can be prepared from other mixtures of potato flakes or potato granules, or other farinaceous materials, with satisfactory handling characteristics. The dough is made to provide sufficient cohesiveness to adhere in sheet form, but not to have so much adhesiveness that it sticks to the equipment used in forming the dough pieces. The moisture content of the dough can vary according to the absorptive characteristics of the starchy food materials used. The moisture content is normally in the range of 35% to 60% based on weight, preferably 40% to 50%.

The dough can be sheeted to any suitable final thickness consistent with the manner of forming used. A typical thickness of the dough piece at the time of initial frying is about 0.9 to 1.0 mm. The dough can be formed by a series of individual sheeting steps or by a single sheeting step, depending upon the characteristics of the dough.

The dough sheet can be cut into desired shapes by a rotating cutter constructed from a non-sticking material such as Teflon. In making an oval shaped potato skin snack, a portion of the dough passing under the cutter is separated from the cut pieces and this unused dough web can be recycled to a mixing station for continued use in the dough formulation. The recycled dough containing both light and dark colored dough material is used to produce a natural mottled appearance in the dark outer layer of the potato skin snacks, as described above.

Products also can be made in shapes requiring no production of unused web; such shapes include triangles, hexagons, rectangles and the like.

In the step of frying the dough pieces in the shallow depth of hot cooking oil, the dough pieces transferred into the fryer at first submerge, but then after about two to three seconds, they rise to the surface due to the buoyant action of the bubbles of steam collecting on the underside of the fried pieces The velocity of the oil can control the speed at which the pieces then are conveyed along the surface of the oil in the shallow depth section of the fryer. The oil flow rate is adjusted to cause the pieces to travel at a speed approximately equal to or slightly greater than the speed at which the dough pieces enter the fryer from the sheeting conveyor. This can maintain good separation between the freely floating pieces as they are fried in the shallow oil depth. Under these conditions the flow of oil is essentially laminar, with minimal turbulence that would overturn the pieces, or otherwise disturb the flow of fried pieces through the oil, or prevent the steam collecting under the pieces to escape.

It has also been discovered that a number of processing improvements can be achieved by first frying the dough pieces in the shallow depth of oil. In this section of the fryer, the pieces travel on the surface of the frying oil. Therefore, the reduced depth of oil minimizes the volume of oil in the system. The reduced oil volume reduces the rate of formation of fatty acids in the frying oil. Experience has demonstrated that the tendency of the pieces to turn over in the oil is eliminated if oil depth is less than or about equal to the maximum width of the fried pieces. For example, oval pieces about three inches long and one inch wide introduced on the top of the frying oil do not turn over during frying when the oil is maintained at a depth of about ½ inch to about one inch.

In one practice of the invention, elongated dough pieces are introduced to the fryer with the narrow end first. As the dough pieces fry on the surface of the oil, they gradually stiffen in the convexly curved shape as water removal continues. Evaporation rate during this period is extremely rapid at normal frying temperatures of about 340° F. to about 380° F. As a result, sufficient water is removed within about the first 5 to 15 seconds of frying so that a substantial amount of the water originally contained in the dough pieces is evaporated. About 35% to about 75% of the water originally present in the dough pieces (depending upon the thickness of the pieces) is evaporated. Once the fried pieces are stiffened adequately, they can be totally immersed in frying oil in a second section of the fryer having a greater oil depth, to complete the frying. The pieces are optionally dispersed uniformly across the second section of the fryer by at least one slowly rotating paddle. The uniformly distributed pieces are then held under the surface of the oil in the second section of the fryer by a submerging conveyor belt to complete water removal.

The shallow depth section of the fryer is also referred to herein as the "free-float" section, in which the dough pieces are free to travel through the oil unsupported externally and to float on the surface without significant physical contact among them as they fry to their set curved shape. The length of the free-float section is predetermined. It depends upon the characteristics of the dough pieces (dough thickness and moisture content) and the required length of the frying time of the pieces in the free-float section of the fryer. The length of the free-float section also is dependent upon the speed at which the pieces travel along the surface of the oil in the free-float section of the fryer, which, in turn, is dependent upon the rate at which they were produced on the sheeting conveyor prior to being transferred into the fryer. For example, the free-float section can be operated to produce a frying time of 8 to 16 seconds, preferably 10 to 14 seconds, in order to fry each of the products sufficiently to set them in the desired shape. This residence time, together with the speed at which the pieces travel through the free-float section, determines the length of the free-float section. The oil flow can be adjusted so that the pieces travel at the same speed at which they were formed and cut, up to approximately a 10% higher speed, to control separation of the pieces as they travel in the free-float section. The flow rate of the oil in the free-float section is maintained so that the pieces travel at this desired speed; and as an example, with pieces traveling from the sheeting conveyor at an average speed of 60 feet per minute, a free-float section about 15 feet long produces a frying time of about 15 seconds. To allow for a 10% greater speed to control the spacing between the pieces, the length of the free-float section would be increased to about 16 feet.

Thus, dough pieces with a relatively high water content (which ordinarily are difficult to maintain in a fixed position during frying because of their flexibility and the evolution of steam from rapid water evaporation) can be fried while remaining unsupported in the frying oil, to produce a controlled shape without physical contact with mechanical means otherwise intended to shape the product.

In addition to the techniques for controlling the shape of the finished product, the invention also includes use of a novel semi-flexible bristle dockering brush for perforating the dough layer prior to frying the dough pieces. This permits dough pieces of a relatively high moisture content to be fried to completion without undesirable puffing or bubbling. The sheeted dough is perforated by a rotating cylindrical brush having radially extending semiflexible bristles. In one embodiment of the invention, the distance between the brush and the dough sheet conveyor belt is adjusted to apply pressure to the tips of the bristles to pre-flex the bristles prior to the dockering step. This allows the bristles to bend when forming the dockering holes in the dough sheet. In another embodiment, the brush is operated at a slower speed than the traveling dough sheet during dockering. These techniques control the point density of dockering holes formed in the dough and prevent the dough from wrinkling or tearing when contacted by the dockering brush. The flexible dockering brush can have a bristle point density of about 80 to 200 points per square inch of peripheral brush surface, for certain products. A dough sheet contacted by such a dockering brush would contain from about 80 to 200 dockering holes per square inch if contacted by brush tips of the same length and if all brush tips formed holes extending completely through the depth of the dough sheet; but in practice the number of discrete perforations extending entirely through the dough sheet is less than the actual brush point density of the flexible bristles. From about 20 to about 100 perforations per square inch or more can be formed through the entire depth of the dough sheet. Surface indentations also are formed in the dough. This high density of small dockering holes and surface indentations eliminates undesired puffing or bubbling during frying, and yet the dockering holes are hardly noticeable in the finished product. Inasmuch as fewer than all of the bristles form completed holes, the dockering hole pattern is unique for each fried dough piece, which avoids the artificial appearance of the uniform hole pattern and large dockering holes resulting from rigid pin dockering.

These and other aspects of the invention will be more fully understood by referring to the following detailed description and the accompanying drawings.

DRAWINGS

FIG. 6 is a perspective view of a frying apparatus used in a preliminary pilot production test.

DETAILED DESCRIPTION

According to one practice of the invention, dough suitable for making fried snack products is prepared from conventional snack food ingredients. The dough is sheeted to a desired thickness, dockered with a flexible brush, cut to the desired shapes, and fried by a float-frying process of this invention. Such a process for making fried snack products from a single layer dough sheet is described with reference to FIG. 1. A two-layer fried snack product is made by a process described with reference to FIG. 2. The dockering process which is described in more detail at a later point is used to prevent puffing during frying in the float-frying process. The same dockering techniques also can be used in other applications to prevent distortion or puffing of fried or baked starch-containing dough products.

Figure 1:
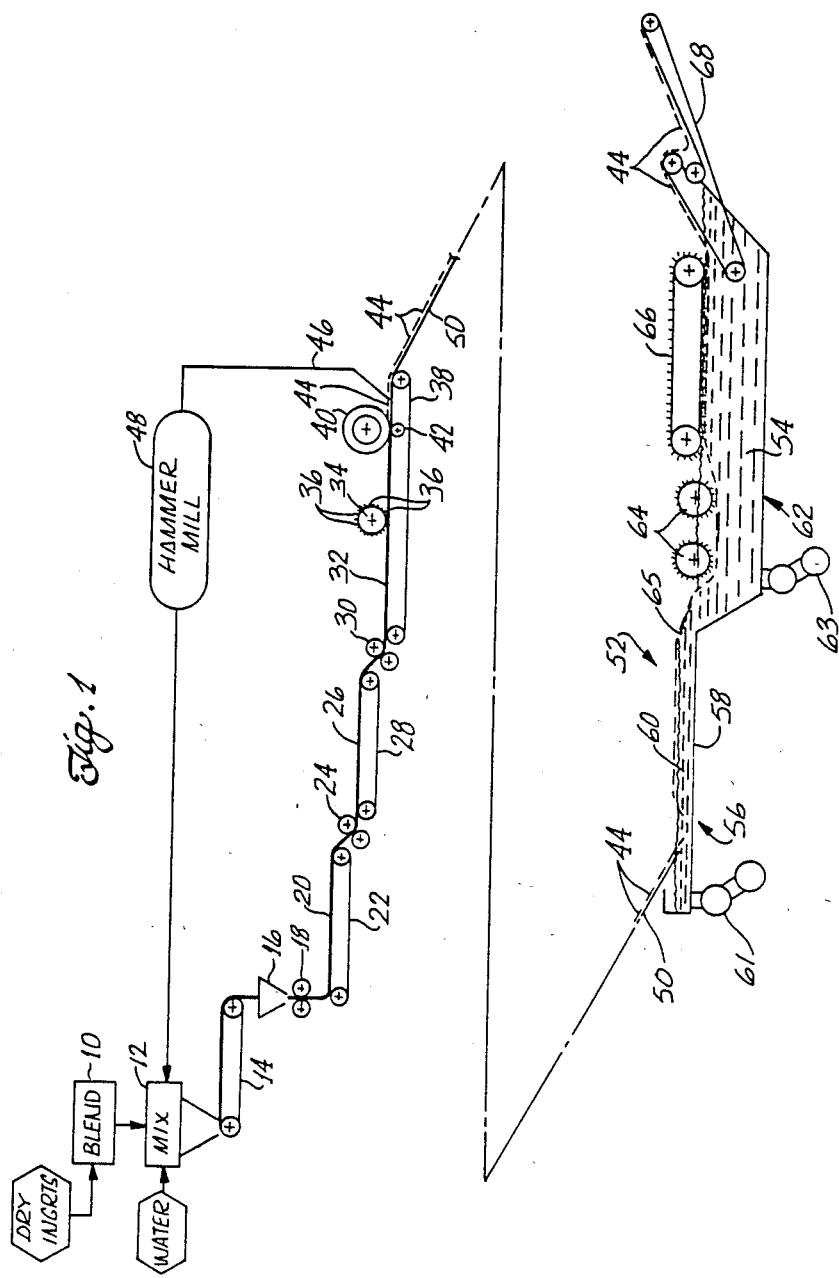
FIG. 1 is a schematic view illustrating a dough preparation, sheeting and fryer system for producing a single layered fried snack product according to principles of this invention. The fryer is not shown to scale.
Figure 2:
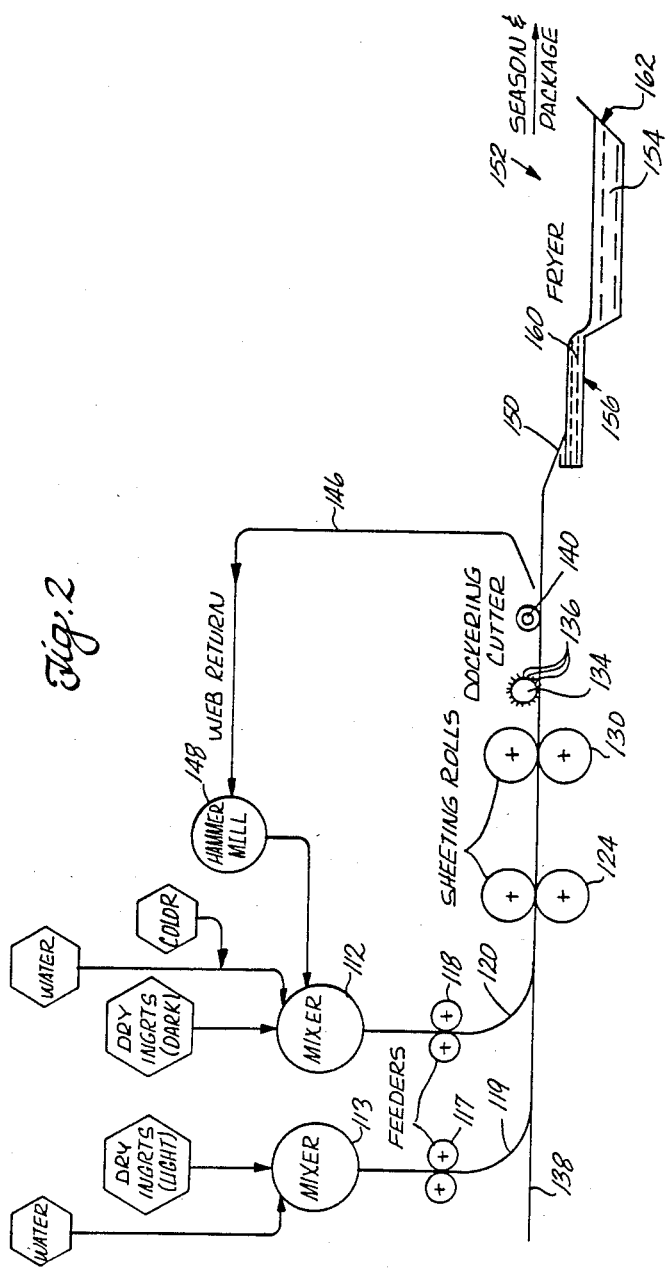
FIG. 2 is a schematic view illustrating a system for producing a bi-layer potato skin snack. The fryer also is not shown to scale and is schematic only.

The dough ingredients for the fried snack process of FIGS. 1 and 2 are generally selected from conventional starch-containing foods traditionally used to make fried crisp snack products. Dehydrated potatoes are the ingredients of choice for preparing the products of this invention. Potato flakes and potato granules can be combined with potato starch or other raw starches, including, but not limited to, corn starch, tapioca starch and amioca starch. According to the practice of my U.S. Pat. No. 3,886,291, the relative quantities of these ingredients can vary over a wide range. The potato products can also be combined with minor amounts of corn solids, using dry milled corn flours recovered from conventional dry milling of corn endosperm which, in turn, may be either in the raw ungelatinized state or fully gelatinized. In addition, whole cereal grains may be added to the potato formulation to achieve variations in flavor and texture. For example, whole grain corn may be added as a dry flour; or alternately, it can be partially cooked, soaked to produce a moisture content of about 50%, and comminuted to a fine particle size, such as through an Urschel Comitrol fitted with a 0.015030 screen. Other cereal grains such as wheat or mixtures of various cereal grains may be processed in a similar manner for use in the snack products of this invention. The potato snacks may also contain optional ingredients such as flavorings, emulsifiers, dough conditioners and other ingredients known to the art to enhance the sheeting of such starch-containing mixtures.

Single Layer Product

Referring to FIG. 1, the dry ingredients for the dough formulation are dry-blended at a station 10 to thoroughly distribute minor ingredients such as emulsifiers and flavorings in the starch-containing solids. The dry mixture can be used immediately or be packaged and later processed into snack products.

The dry ingredients are mixed with water in a mixer 12. The water can be at a temperature from about 60° F. to about 110° F. during the mixing step. The type of mixer used and quantity of water added to the dough solids are dictated by the choice of ingredients and the desired characteristics of the finished snack product. The moisture content of the dough is generally in the range of about 35% to about 60%. Good results have been achieved with the process of this invention when the moisture content of the dough pieces, at the time of frying, is from about 40% to about 55%, by weight of the dough. A few examples will describe possible choices of mixing techniques for purposes of this invention.

For production of a relatively noncohesive dough, mixing can be carried out in a paddle-type mixer such as the Marion mixer, model 6021, available from Rapids Machinery, Marion, Iowa. For a more cohesive thoroughly mixed dough in which a degree of shear is desired, a 3600 rpm chopper, available from Rapids Machinery, can be used with a paddle mixer. Another mixer ideally suited for blending dry ingredients into a cohesive but uniform mix is the Stephan mixer, available from Stephan Machinery Corporation, West Germany. In this mixer, rotating blades fixed to a central shaft are driven at speeds from 900 to 3600 rpm, while a scraping arm continuously removes material adhering to the inner surfaces of the mixer. Mixing times in such units are shorter by a factor of 10 or 20 than the more conventional paddle mixers. Due to the high level of energy transmittal to the dough during mixing, mixing time must be carefully controlled. The Stephan mixer is particularly useful when minor quantities of ground cooked corn are added to potato snack formulations and also when minor amounts of dry ingredients are added to comminuted cereal grains in producing cereal based snacks.

Alternatively, premixed dry ingredients and liquids can be mixed continuously and fed to the feeding rolls. Continuous blending mixers for adding water to premixed ingredients are available from several sources, including Littleford, Wenger, etc. Continuous mixing greatly simplifies continuously feeding dough to sheeting rolls; but it requires careful adjustment and measurement of flow-controlling devices for the dry and liquid ingredients in the process. Continuous moisture monitoring devices, such as those from sources such as Kay-Ray, are used to measure and control water addition to the dough to establish uniform processing characteristics throughout remaining steps of the process.

The mixed dough is fed to a sheeting line either dropping the charge dough into a hopper above the first roller, or preferably by depositing it on a conveyor 14 traveling from the mixer 12 to a hopper 16 feeding a first set of feed rolls 18. Either multiple sheeting rolls or a single set of rolls, such as those used in the tortilla chip industry, may be used for sheeting the dough. The illustrated process shows the preferred sheeting technique, that of using multiple sheeting rolls, which, for convenience, have been shown as three sets of rolls. The dough is sheeted to a thickness in the range of about 0.8 mm (0.031 in.) to about 1.2 mm (0.047 in.). Experience with the three-roll system has shown that most snack products of this type are best extruded through a 1.5 mm (0.059 in.) opening in the feed rolls 18, followed by feeding the resulting dough sheet 20 by a conveyor 22 to a second set of reduction rolls 24 for reducing the resulting dough sheet 26 to a thickness of about 1.1 mm (0.043 in.), and then conveying the dough sheet by a conveyor 28 to a third set of reduction rolls 30 for reducing the final dough sheet 32 to a thickness of about 0.95 mm (0.037 in.). Those experienced in the art will recognize that other variations of the roller forming process are possible depending upon the consistency of the dough and the desired finished product. For example, in production equipment, a differential speed between sheeting and final gauging rolls is sometimes essential to transfer dough from the desired upper or lower roller to the final sheeting conveyor. The peripheral velocity of these rollers can differ from zero to about 10% to conveniently transfer the dough. Also, differentially heated reduction rollers can be used to transfer dough through sheeting rollers to minimize sticking to the rollers and to facilitate reduction in dough thickness according to conventional bakery technology.

After sheeting the dough to its final thickness, the dough sheet is perforated by a dockering brush 34 to reduce puffing during subsequent frying. The dockering brush has a multitude of thin, semi-flexible bristles 36 of uniform diameter projecting radially from fixed ends on a cylindrical roll. The cylindrical surface of the dockering roll (the body of the roll without the bristles) is spaced a short distance above the top of the conveyor belt carrying the dough sheet. The dockering brush is mounted so the rotational axis of the roll is parallel to the top surface of the dough conveyor belt. The dockering roll is connected to a drive (not shown) which is separate from the conveyor belt drive (not shown) so that brush speed can be adjusted relative to belt speed. The elevation of the dockering roll axis above the dough sheet conveyor belt also is adjustable. The length of the bristles is sufficient to puncture the moving dough sheet as the roll is rotated to force the tips of the bristles into and through the depth of the dough sheet. The dockering roll is rotated so that the tips of the bristles during dockering are moving in the same direction as the dough sheet. Preferably, the length of the bristles is greater than the minimum spacing between the cylindrical surface of the dockering roll (where the fixed ends of the bristles are attached) and the top surface of the dough sheet conveyor belt. This applies a pre-flex to the bristles. Stated another way, the spacing between the dockering brush and dough sheet is such that the bristles, if not flexed, would penetrate through the dough sheet and the supporting conveyor to a level about 2 to 4 mm (0.079 to 0.16 in.) below the top surface of the conveyor belt. The dockering brush is fixed at an elevation above the dough sheet conveyor that applies pressure to the tips of the bristles to bend them at the points where they engage the dough sheet conveyor belt.

The pre-flexed bristles preferably engage the surface of the dough sheet while the brush is moving at a slower velocity than the velocity of the dough sheet. This causes the bristles to be first pulled into the dough sheet and penetrate the entire thickness of the sheet. As the bristles then emerge from the sheet, the resiliency of the bristles forces the sheet forward, assisting its release from contact with the bristles. The combined flexibility of the bristles and slower speed of the brush relative to the dough sheet prevent the dough from sticking to the dockering brush and wrapping around the brush or otherwise being misshapen from its contact with the dockering brush. As a result, a large point density of dockering holes can be used to effectively perforate the dough sheet.

The bristles are semi-flexible in the sense that they are flexible laterally They bend under a tangential force at the tips of the brush from contact with the moving dough sheet. This causes the bristles to bend in planes parallel to the direction the dough is traveling. The bristles also are stiff longitudinally to the extent that they resist lateral bending sufficiently to perforate the pliable dough piece. The bristles also are resilient in the sense that they can bend and then return to a normal essentially straight position after the deformation force is released. Long thin bristles made from a plastic material have this combination of desired characteristics. As the bristles begin their upward rotation after perforating the dough sheet, the bend caused during contact with the moving dough sheet is relaxed, causing the bristles to extend slightly in the direction of the sheet motion before lifting free from the dough sheet. This creates an oblated cone-shaped hole in the sheet, with the large portion of the conical opening in the top of the sheet. Forming the elongated conical holes facilitates release of the dough sheet from the tips of the bristles and prevents the dough from sticking to the bristles.

Use of a dockering brush with the flexible bristles also makes it possible to use a larger number of bristles per unit of area for perforating the dough sheet, when compared with a dockering roll having rigid metal spikes or pins. The large point density of the flexible bristles can be used without the dough wrapping around the bristles or otherwise adhering to the rotating brush during the dockering step. Further details and advantages of the flexible dockering brush are described below.

The dockered dough sheet is transferred by a continuous conveyor 38 through a cutting device such as a rotary cutting die 40 which impinges on the dough sheet and on the conveyor against backup rolls 42 located beneath the upper run of the conveyor. The rotary die cuts the dough sheet 32 into individual thin, flat dough pieces 44 of desired shape. The cutting die preferably cuts the dough sheet into a series of side-by-side shapes across the width of the dough sheet, producing parallel series of spaced apart cut dough pieces 44. When cutting round or oval shaped pieces, unused dough web from between the cut pieces can be separated and recycled by a conventional web return system 46. The dough is recycled either to the dough mixing station 12, as illustrated, or directly to the initial sheeting rolls via the hopper 16. If desired, the returned dough web can be reduced in size by an optional hammermill 48. The quantity of web removal from the dough sheet typically averages about 35% of the final sheeted dough for most curved or oval products. For shapes such as squares, rectangles and variations of triangles, products are made with an interlocking design, thus eliminating the web return step.

The dockered and cut dough pieces 44 are then cooked by transferring them from the sheeting conveyor 38 to a sloping input conveyor 50 and are then introduced into a fryer 52. The moisture content of the dough and its composition have not been altered to any significant extent between the initial step of dough preparation, during sheeting, dockering and cutting, and prior to the frying step. The input conveyor 50 can be made from woven stainless steel and is arranged so that the rows of dough pieces can be directed downwardly at an angle into the fryer and discharged a short distance above the hot cooking oil 54 contained in the fryer. The adjacent leading edges of the conveyors 38 and 50 are normally designed with a small diameter turn so that the dough pieces transfer easily between the conveyors and into the frying oil. The smaller rollers for the input conveyor 50 and the small diameter roll at the leading edge of the sheeting conveyor 38 are not shown in FIG. 1 for simplicity.

The dough pieces 44 leaving the input conveyor 50 enter the frying oil in a first section of the fryer, also referred to herein as a "free-float" section 56 of the fryer. In this section of the fryer the dough pieces freely travel through the oil unsupported externally. The pieces at first continue under the surface of the frying fat until the steam collecting under the pieces raises them to the surface. This normally requires two to three seconds depending upon the moisture content, dough thickness, and other physical characteristics of the dough pieces. It is important for the dough pieces being fed into the frying oil to be fried well (on both sides) initially. This is accomplished by initially conveying the dough pieces into the oil so they are submerged for a short time. The water content of the dough at this time is at its maximum, and the bubbles of steam liberated during this initial step in the frying process could normally cause the products to turn over, tumble, or otherwise travel randomly or slow down at this point in the frying process, if fried in a conventional fryer. This can interfere with the free flow of products through the fryer, and it can prevent any controlled shaping of the product in the free-float section of the fryer. Conventional snack fryers are operated with an oil depth of four to six inches at the point where the dough pieces enter the fryer. This is commonly the point where oil enters the fryer from a distributing manifold from which the oil flow is normally quite turbulent. A sheeting line as described herein would have, in the past, been operated with the transfer conveyor 50 traveling at a speed ranging from about 40 to 100 feet per minute, typically about 60 feet per minute. Dropping the thin, flexible dough pieces into such a turbulent flow of oil at the inlet of such a conventional fryer with a conventional oil depth would cause the pieces to tumble in the oil and result in random distortion of the fried pieces.

These problems are avoided by free-float section 56 of the fryer, which is formed by an elongated flat and shallow pan 58 containing a shallow depth of frying oil 60. The dough pieces conveyed into the shallow depth of oil rise to the surface after they are initially submerged, and then flat freely on the surface of the oil as they travel the length of the free-float section of the fryer. The frying oil enters the shallow section of the fryer through an oil inlet 61 at the front portion of the shallow frying pan. The oil is distributed uniformly across the width of the fryer so that the oil 60 in the shallow pan 58 constantly flows lengthwise along the pan at a rate which produces the desired residence time of the dough pieces in the free-float section of the fryer. The flow rate of oil also is adjusted to keep the fried pieces traveling lengthwise along the surface of the oil in the shallow pan, while avoiding mutual contact between the pieces which could disrupt shaping of the pieces as they are fried. To accomplish this, we have found that the oil flow rate should be adjusted so that the speed at which the pieces travel on the surface is maintained at a speed approximately equal to or up to about 10% higher than the speed at which the dough pieces are produced on the sheeting conveyor 38 and enter the oil on the input conveyor 50. For example, when the speed of the sheeting conveyor 38 and input conveyor 50 is about 60 feet per minute, the flow rate of the frying oil 60 is controlled so that the pieces continue through the frying oil at a rate from about 60 to about 66 feet per minute If the oil flow rate is substantially lower, the pieces will rest on top of each other as they rise to the surface of the oil. This allows escaping steam to pass under each side of the piece, rather than producing the desired curved shape. If the velocity of the pieces in the oil is greater than about 10% higher than the velocity of the pieces on the conveyor, the free-float section must be extended to a considerable length to achieve the desired residence time in the free-float section which will produce the necessary stiffness of the shaped products In addition, higher oil flow rates can cause more turbulence in the free-float section, which can cause steam to escape from under the frying pieces at the top surface of the oil and reduce the quantity of pieces of desired curved shape The flow rate of the oil in the free-float section is therefore controlled in relation to the rate at which the dough pieces enter the fryer to produce a smooth uniform flow of properly separated pieces through the free-float section of the fryer. The length of the free-float section is determined by the product flow rate and the necessary residence time to produce a set shape in the products The oil flow rate is controlled so that oil flow is smooth, or essentially laminar in the sense that the oil flow avoids any turbulence which would cause the pieces to tumble, travel at random, or otherwise interfere with the smooth uniform flow of the pieces through the free-float section of the fryer.

The depth of the frying oil in the free-float section 56 in relation to the size of the pieces 44 is sufficient to ensure that the dough pieces will enter the frying oil 60 and fry while freely floating on the oil and while traveling the length of the shallow oil depth, without overturning in the fryer until the set curvature of the fried pieces is achieved. Such frying occurs substantially without physical contact with other objects, and the frying in the shallow oil depth produces the controlled curved shape of the pieces with dehydration sufficient to set the curved shape during the time the pieces are frying in the shallow depth of frying oil. In one method of frying in the free-float section 56, the depth of the frying oil 60 is less than or about equal to the maximum width of the pieces entering the fryer. This relation between the depth of the oil and the size of the pieces opposes the natural tendency of the pieces to turn over as they enter the oil and as they travel the length of the free-float section. Good results are produced when the shallow oil depth is from about one-half to about the same as the maximum width of the dough pieces entering the fryer. The shallow depth is substantially uniform from one end of the shallow frying section to the other. As described previously, the dough pieces enter the oil at the angle of the input conveyor 50 and are initially submerged under the surface of the oil, after which they rise to the surface of the oil and float along the surface, unsupported by the bottom of the shallow pan. Accumulation of steam under the dough pieces causes the floating pieces to naturally assume the convexly curved shape in the shallow depth of oil. The force on the pieces from the evolved steam could ordinarily cause the pieces to tumble, but the shallow oil depth stabilizes the pieces and prevents them from turning over, assisting in guiding them to the surface with the same orientation at which they entered the fryer.

The pieces are partially fried in the free-float portion of the fryer, and the curved pieces are in a relatively stiff but plastic condition by the time they reach the end of the shallow pan. Fry time in the free-float portion 56 of the fryer is from about 8 to about 16 seconds, preferably 12 to 14 seconds, for snack products made from an initial dough containing from about 40% to about 55% moisture and sheeted to a final thickness of about 0.9 mm (0.035 in.) to 1.05 mm (0.041 in.) before frying. In one embodiment, dough pieces containing 40% to 55% moisture and about 1.0 mm (0.039 in.) in thickness are formed on the sheeting conveyor 38, which is operated at 60 feet per minute. The pieces are fried about 14 seconds in a shallow pan 14 feet long, with an oil depth of about 0.625 to 0.875 inch (1.6 to 2.2 cm), and a frying oil inlet temperature of about 360° F. to about 375° F. During this frying step, about 45% to 75% of the water contained in the dough is removed, which results in a good set convex curvature of the oval shaped pieces.

A second section 62 of the fryer downstream from the free-float section 56 communicates with the free-float section and has a greater depth of frying oil than the free-float section. The fried pieces travel from the free-float section into the second section of the fryer where frying is completed. The partially fried dough pieces entering the second section of the fryer have been stiffened to the extent that they can be fried in the deeper volume of frying oil to evaporate most of the water remaining in the pieces without significantly affecting the pre-set shape of the pieces. In a preferred arrangement of the fryer, the oil level and oil depth in each section 56 and 62 of the fryer are both independently controlled. The surface of the oil in the free-float section is elevated above the surface of the oil in the second section of the fryer. The independent control over oil depth in the free-float section prevents any change in oil depth in the second fryer section from affecting the critical shallow oil depth in the float section. In operation, a gently sloped ramp 65 at the end of the float section directs the oil and the partially fried, stiffened pieces down into the second section of the fryer at or near the point where additional heating oil is introduced through a second oil inlet 63. The ramp is formed by a downwardly inclined flat bottom plate of the fryer pan extending from the end of the shallow pan into the entrance of the region of the second fryer section. The oil flowing over the ramp merges smoothly with the oil in the second fryer section. The flow rate reduction in the second fryer is gradual to avoid substantial turbulence which can distort the shape of the pieces.

The pieces are conveyed along the second fryer section 62 at a desired velocity The temperature of the frying oil entering the second fryer section 62 is substantially the same as the temperature of the oil entering the free-float 56 of the fryer, although the temperature of the oil in the second section is reduced by the inlet oil mixing with the exit oil from the float section at the transition point where the pieces are transferred into the second fryer section. Additional heated oil at the desired frying temperature, preferably 350° F. to 370° F., is introduced to the fryer through the second oil inlet 63. Additional oil is required in the second section 62 to provide the necessary thermal energy to reduce the moisture content of the pieces to a final level of about 2.0%. In addition to the introduction of hot oil at the beginning of the second section of the fryer, optional auxiliary heaters (not shown) can be installed under the surface of the oil in this section of the fryer to maintain the desired oil temperature.

An optional pair of rotating paddles 64 are rotated within the upper portion of the frying oil in the second section of the fryer. The rotating paddles equalize the distribution of snack pieces across the width of the fryer and retard the flow rate of the pieces gently without distorting the shape of the pieces. An endless submerging belt 66 contacts the upper surface of the frying oil in the second portion of the fryer downstream from the paddles. The submerging belt holds the bed of fried pieces under the surface of the frying oil for a pre-set period of time, depending upon the length and speed of the belt. Belt speed is adjusted so the pieces fry to a uniform final moisture content. The frying oil in the second section of the fryer is of conventional depth, between four and six inches (10.2 to 15.2 cm) deep, to allow the accumulation of products behind the rotating paddles and under the submerging belt. In one embodiment described above, in which the original dough pieces contained 40% to 55% moisture and were fried about 14 seconds in the shallow pan, the frying time in the second section of the fryer was between 40 and 45 seconds. The rate of travel of the pieces through the second section of the fryer is adjusted by the paddle speed and the submerger belt speed.

A separately controlled upwardly sloping stepped exit conveyor belt 68 removes the fried pieces from the oil, draining them of excess oil and delivering them to final cooling, seasoning and packaging operations.

Dough pieces ideally suited for the practice of this invention are elongated and elliptical, or otherwise oval or rounded in shape. It has been further discovered that oval shaped dough pieces should be introduced into the shallow depth of oil with the their narrow ends first, that is, with the major dimension of the dough pieces parallel to the direction of the oil flow. This provides a smoother transition from the input conveyor 50 into the float section 56 of the fryer. Rounded pieces of any shape (e.g., oval, elliptical or circular) maintain surface contact between the oil and the outer peripheral edges of the pieces, which remain at the level of the frying oil during frying in the free-float section 56 of the fryer. Pieces of this shape fry to a controlled convexly curved shape in the shallow oil depth when freely floating in the frying oil. Oval shaped pieces fry to a somewhat inverted canoe shape, and circular pieces fry to a dome shape. Square, rectangular, hexagonal or triangular shaped pieces fried in the shallow depth fryer of this invention also assume a curved center portion as do the circular and oval shaped pieces.

The size of the dough pieces has little effect on the tendency of the pieces to naturally assume the convexly curved shape during frying in the free-float section Therefore, it is possible to produce, at the same time, products having different shapes, or products of the same shape with different sizes. The ability to produce rounded products of varying shapes provides a distinct advantage in controlling the shapes of the finished products. A group of such products give the appearance of having been made in random shapes by virtue of being similar in shape without all products being identical in shape. This is an advantage when compared to entirely uniformly shaped snacks, one example of which is the fabricated potato chip sold under the trademark Pringles. Because of its uniformity, that product has an artificial appearance avoided by the method of this invention.

Two-Layer Snack Product

According to a preferred practice of the invention, two concurrently formed dough sheets are positioned one over the other, pressed together, reduced in thickness, dockered and cut into snack shapes, and fried by a process substantially the same as that described above for the single dough sheet. By combining two individually formulated and mixed components into a bi-layered product, a number of advantages are provided. For example, it is possible to combine dark and light colored formulations of potato dough ingredients into a layer product that simulates a potato peel section cut from a raw potato. It is also possible to use white corn and yellow corn in a novel sheeted bi-layer corn snack. A corn-based ingredient can be combined with a substantially wheat-based mixture of ingredients to form a novel two-layer whole grain snack. These bi-layer products are sheeted and fried as shown in the schematic illustration of FIG. 2.

While the combinations of cereal-based ingredients provide opportunities to create new snacks with distinctive shapes and flavors, a preferred embodiment of the invention is a bi-layer, two colored potato snack resembling a potato skin. The skin from a baked potato is now recognized as an important part of the diet. Potato periderm, or the brown external skin of the potato, contains unique flavoring ingredients and a high proportion of healthful fiber. The layer of cells approximately 1 mm below the skin contains the highest level of nutritional components in the potato. Many restaurants feature hors d'oeuvres of scooped-out baked potatoes that are later deep-fat fried and filled with various condiments. Frozen potato products and conventional potato chips also are now made from unpeeled potatoes. Attempts to produce shelf-stable snack products from raw potatoes incorporating potato skins have generally not been successful. Even conventional potato chips made from unpeeled potatoes have not been well accepted because of the unsightly appearance produced by the adhering particles of potato skin, when compared to potato chips made from conventional cleanly peeled and trimmed potatoes.

It has been discovered that a highly acceptable potato skin snack can be made by the process of this invention. Concurrent production of light colored and dark colored potato dough fractions each having a moisture content between 35% and 60%, preferably from 40% to 55% moisture, makes it possible to compress the two dough layers together in a multiple sheeting operation so that the two dough sheets form coherent layers in the finished fried snack. Use of the semi-flexible bristle dockering brush controls puffing in the finished product and eliminates presence of unsightly large bubbles. The float-frying technique makes it possible to produce a random-appearing but similar degree of curvature in the fried products. In the potato skin snacks, the darker colored convexly curved outer surface resembles the actual outer surface of a fried baked potato skin. The lighter colored concavely curved inner surface of the fried product resembles the actual interior portion of a potato. The simultaneous production of a number of dough pieces of varying size, each curved similarly, but not identical in shape, results in potato skin snacks that suggest the appearance of random sections removed from fresh randomly sized baked potatoes.

Use of a toasted potato peel ingredient in the darker colored exterior portion of the potato skin snack produces a mottled exterior appearance resembling that of a natural fried potato skin made from potato peelings removed from fresh baked potatoes.

Referring to FIG. 2, dry potato ingredients such as potato flakes, potato granules and optional ingredients such as potato starch and seasonings are blended. Dry ingredients for separately making the darker colored dough and the lighter colored dough are each mixed with water to form a cohesive dough which is sufficiently non-adhesive to permit sheeting. In this process it is convenient to use two mixers, one mixer 113 to prepare the lighter colored dough and another mixer 112 to prepare the darker dough, although a single larger mixer can be used alternately for each dough. The lighter dough from the mixer 113 is distributed to feed rolls 117 where a preliminary lighter dough sheet 119 is formed and deposited on a main process conveyor 138. Dry ingredients are concurrently blended with water in the mixer 112, along with a solution of brown food coloring such as caramel color and recycled dough 146 from the subsequent dough cutting system. The recycled dough optionally may be ground to uniform size by a hammer mill 148 before admixing with the dry ingredients, water and coloring solution. The darker dough from the mixer 112 is distributed to feeder rolls 118 from which the preliminary darker dough sheet 120 is deposited on top of dough sheet 119 to form the initial bi-layered dough sheet. Typical thicknesses for the preliminary dough sheets 119 and 120 are about 1.5 mm (0.059 in.) each, depending on the moisture content of the dough, the equipment used, and the design of the sheeting equipment.

The total dough thickness of the two-layer composite dough sheet is reduced to about 1.0 mm (0.039 in.) by a single pair of sheeting rolls 124, or optionally by one or more additional sets of sheeting rolls 130. The reduction rolls press the two overlying dough sheets together, and free starch liberated from each dough sheet at the interface between them adhesively bonds the adjacent dough sheets. The layered dough sheet is then dockered by the semi-flexible bristles 136 on a dockering brush 134. The final dough sheet is then cut into oval shapes by a cutter roll 140. After cutting, the unused dough web 146 is returned to the optional hammer mill 148 and then to the mixer 112 for the darker colored dough ingredients. The cut pieces are transferred to a downwardly inclined conveyor 150 and fried in a fryer 152. The fryer is similar to the fryer 52 described above. The fryer 152 includes the shallow depth of frying oil in the elevated free-float section 156 of the fryer. The pieces are partially fried in the free-float section sufficiently to impart a set convex curvature to the pieces without the pieces overturning in this section of the fryer. Since all dough pieces fed into the free-float section of the fryer have the darker layer facing upward, the pieces which are fried in the free-float section have the darker layer facing upward for the entire length of this fryer section. Oval shaped bi-layer pieces in this section of the fryer naturally form a convex curvature, in which the entrapped steam causes the central portion of each piece to curve upward from the level of the oil, while the outer peripheral edge of the piece remains sealed to the oil. This causes the pieces to have the darker layer at the upper, convexly curved side of the fried pieces, while the lighter colored inner surface on the opposite side of each piece is concavely curved. The partially fried and substantially permanently shaped pieces are then fed from the free-float section of the fryer to a greater depth of cooking oil 154 in a second section 162 of the fryer. A rotating paddle (not shown for simplicity) transfers the pieces from the free-float section of the fryer to beneath a submerger (not shown) downstream from the rotating paddles. The pieces are fried to completion in the second section of the fryer and then removed from the fryer.

Figure 3:
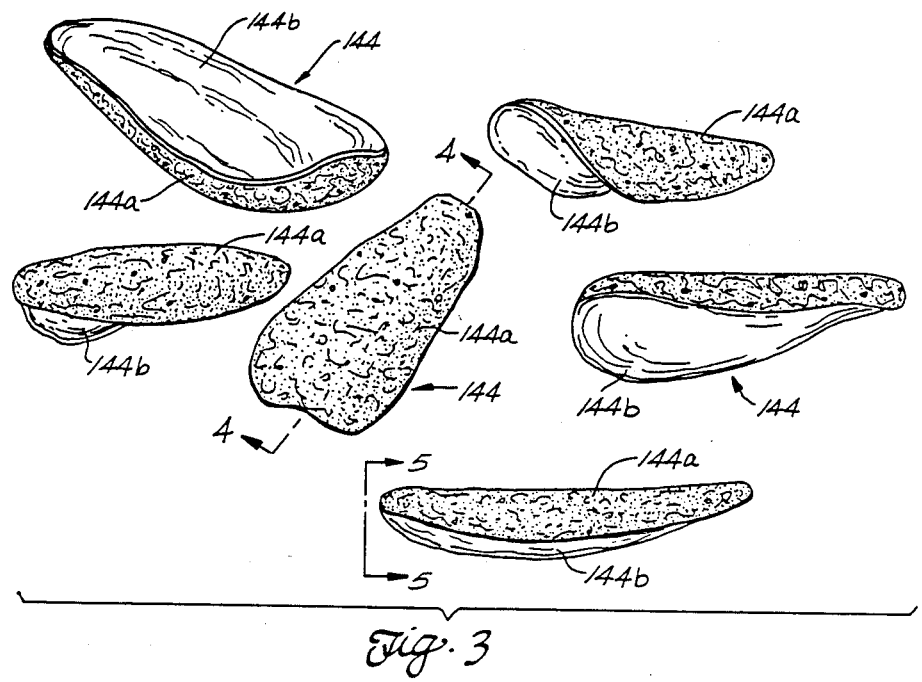
FIG. 3 is a perspective view illustrating a random sampling of the fried potato skin snack.
Figure 4:
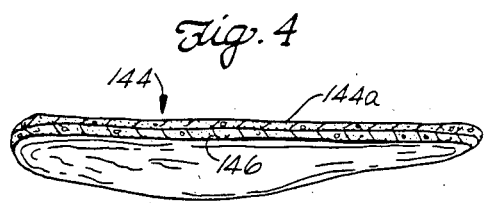
FIG. 4 is a cross-sectional view taken on line 4—4 of FIG. 3.
Figure 5:
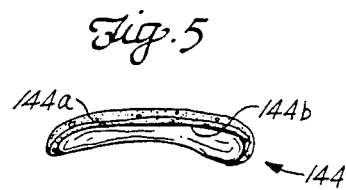
FIG. 5 is an end elevational view taken on line 5—5 of FIG. 3.

FIGS. 3 through 5 illustrate two-layer fried products 144 made by the process of FIG. 2. These fried products were fried from originally flat, thin oval shaped dough pieces. The finished fried pieces have an elongated convexly curved darker colored upper layer 144a formed integrally with a lighter colored concavely curved lower layer 144b. The pieces are formed and fried in a continuous process in which the darker colored layers are consistently on the upper convexly curved surface of the finished fried products, owing to the substantially permanent shaping of each piece in the free-float section of the fryer. The drawings illustrate that the finished fried pieces have a similar but non-uniform appearance. This produces snack products resembling randomly cut sections of a baked potato.

The appearance of the bi-layered fried potato snacks is novel because of their consistently formed brownish convex surface, but it has been found that such products can appear artificial if brown food coloring only is used for imparting the darker color to the convex outer dough layers. Although this alternative is possible within the practice of this invention, improvements have been made to the appearance of the finished product to produce a mottled appearance more accurately resembling a natural baked potato skin. For example, distribution of brown coloration in the darker colored brown dough is purposely made non-uniform so that, when the dough is sheeted, white and brown striations are clearly visible in the dough sheet. This can be produced by delaying addition of the coloring ingredient until near the end of the mixing cycle. Even better results are obtained by adjusting the mixing sequence used for recycling the dough web remaining after the cutting step. The reused dough assists in producing the mottled appearance in the dark dough inasmuch as the dough web contains about 50% light colored product. A non-uniform inclusion of cut pieces of recycled web particles into the otherwise uniformly dark dough mixture produces light colored striations in the sheeted product. In one embodiment, a portion of the cut recycled dough pieces is added to the mixer near the end of the mixing cycle so the agitation required during mixing to thoroughly distribute water into the remaining dough ingredients does not disperse the light and dark sections into the recycled dough pieces. In operation, a quantity of from 30% to 70% of the total returning dough web can be added separately toward the end of the mixing cycle, to achieve the desired mottled effect. For example, in an 80 second total mixing sequence in a batch mixer, about 50% of the web is added at the beginning of the mixing sequence along with the dry ingredients and water, after which it is mixed about 70 seconds. The mixer is stopped and the final portion of about 50% of unused dough web is added, after which the mixing is continued for an additional 10 seconds.

In addition, potato peels can be recovered from potato granule manufacture (reference Potato Processing. Avi, Third Edition) and added to the dry mixture used for the brown layer formulation at levels from 0.1 to 5.0%, based on total dry ingredients. Small granule agglomerates can be recovered with the potato peelings and included in the formulation. The granule agglomerates tend to darken somewhat during drying to a stable moisture content and thus contribute to the mottled brown appearance of the brown peel layer. Food grade quality potato peelings also can be obtained by dehydrating diced potatoes produced from raw unpeeled potatoes by washing, cutting, blanching and dehydrating by conventional means. Such dehydrated pieces can be partially rehydrated and introduced into the dough formulation so that portions of white flesh and dark skin remaining on the particles become apparent in the final fried product. The particles can be toasted if desired to give an incrementally brown appearance to the finished product. For example, the diced dehydrated potatoes made from peeled or unpeeled potatoes can be crushed to pass a 20 mesh (U.S. sieve), toasted at 325° F. for a period of about 10 minutes to achieve a color of from between 34 and 45 measured on an Agtron Model E-5F colorimeter, and added at a level of about 1% to 20%, preferably 10% of the total dry solids in the brown product formulation.

Pilot Plant Fryer

FIG. 6 illustrates a pilot plant fryer for producing potato skin snacks such as those illustrated in FIGS. 3 through 5. The fryer is modified to provide a free-float section 256 which comprises an elongated flat bottomed pan 258 which, in the illustrated embodiment, is about six feet long and about one foot wide. The free-float section has long parallel side walls 259 for containing the shallow depth of oil which is introduced to a reservoir 74 extending across the width of the free-float section and its oil supply line 72 may be removed from the conventional single stage fryer 262, if desired. The second section of the fryer includes an 18-inch wide elongated pan with long parallel side walls 263 about six inches in height. The overall length of the second section provides a total of six feet frying space.

Paddles 264 are mounted for rotation on bearings on opposite sides of the second section of the fryer. The paddles can be varied infinitely in speed by a drive motor 78. Only one paddle is shown in FIG. 6, although no paddles or several spaced apart paddles may be used. The paddles have elongated 12-inch or 18-inch wide radially extending blades 80 extending to a maximum depth of about 1.5 inches below the top surface of the oil in the second section of the fryer.

An endless submerger belt (not shown) about three feet long is driven by a variable speed motor 82 which can be varied to produce a frying time in the second fryer section of between 30 seconds and four minutes.

Oil is withdrawn from the end of the fryer beneath the product removal station 268 through an outlet pipe 84. The withdrawn oil is pumped by a centrifugal pump 86 through the heat exchanger 70 and through the manifold 76 and into the inlet section of the fryer.

When the fryer is operated as a single stage fryer, the oil depth is from about two to four inches at the inlet point immediately inside the leading edge of the fryer near the discharge from the oil manifold 76.

When the fryer is operated as a two-stage fryer, with the first stage as a free-float section, the shallow tray 268 is positioned to extend about 12 inches (30.5 cm) over the inlet of the second stage fryer 262. The inlet line 72 connected to the discharge of the heat exchanger diverts the desired flow of oil into the inlet of the float section 74 via a throttling valve, not shown. Dough pieces are conveyed into the free-float section 258 of the fryer at a point approximately 6 inches (15.2 cm) from the discharge of the manifold 74, after which the dough pieces are conveyed on the surface of the oil in the free-float section until they drop a vertical distance of about two inches into the oil in the second section of the fryer.

To simulate production equipment when using the free-float section, the effective width of the second section of the fryer was narrowed to 12 inches by inserting a 12-inch (30.5 cm) wide temporary pan (not shown) corresponding to the 12-inch width of the free-float section. In addition, a 12-inch wide paddle 264 was installed to fit inside the auxiliary fryer pan.

Flexible Brush Dockering

Dockering is a traditional operation in the bakery industry where products such as saltine crackers are perforated at regular intervals to control expansion of the finished product and to achieve a uniform appearance. A process for dockering corn chips is described in U.S. Pat. No. 2,905,559 to Anderson et al. This dockering device uses sharp pointed spikes spaced on centers between ⅛ inch and ¼ inch (0.32 cm and 0.64 cm) apart. The spikes have a diameter of 1.6 mm (0.063 in.). We have found that the flexible bristle brush provides significant advantages over dockering with rigid metal spikes or pins. A wide spacing between larger diameter rigid metal spikes or pins is unsatisfactory for the thin sheeted snack products of this invention. The flexible bristle dockering brush eliminates the possibility that metal particles can break from the sharp pointed dockering pins and become lodged in the finished product. Another advantage is the ability to form a larger number of closely spaced holes and point impressions in the surface of the finished snack. Such dockering is highly effective in reducing puffing in thin sheeted fried snacks made from a moist dough. A further advantage is that the brush points can have a smaller diameter so that the perforations in the finished product are not readily apparent. We have found, for example, that thin, semi-flexible 0.020 inch (0.51 mm) diameter nylon or polypropylene bristles, when distributed at the periphery of the brush at about 80 to 140 points per square inch of peripheral surface, perforate the dough substantially uniformly. That is, a large number of small discrete holes or indentations are formed across the surface of the dough sheet in a reasonably uniform pattern. Puffing during subsequent frying is greatly reduced in the finished fried product, and any small discrete holes that penetrate the entire depth of the fried pieces are virtually impossible to detect. However, the semi-flexible bristles form a discrete hole pattern in the finished product which is entirely random, i.e., unique from chip to chip. Because of the variations in length inherent in the flexible bristles and because the bristles flex during dockering, the number of holes per unit area formed in the dough sheet by the bristles is less than the actual point density of the bristles at the periphery of the brush. With a preferred point density of about 140 bristles per square inch, for example, the actual number of holes formed in the dough sheet (before frying) varies from about 70 to about 120. The number of discrete holes extending through the entire depth of the fried piece is lower. Generally speaking, the number of completed holes formed in the fried product, per unit area, is directly proportional to reduced bubbling in the finished product. Thin fried snack products having more than about 20 completed holes per square inch are essentially free of undesired puffing or bubbling.

We have also discovered another significant difference between the dockering method used in this invention and dockering as used in the baking industry. Conventional dockering rolls normally have the same diameter as the rotary cutter which follows the dockering roll. A single drive is used to achieve the same peripheral speed for both rotating units. For example, a 12-inch rotary cutter may be used with a dockering device of 12-inch maximum diameter at the tip of the rigid metal perforating units. With a belt speed of 60 feet per minute (18.3 m/sec.), both the cutter and dockering roll rotate at 19.09 rpm, producing the same peripheral velocity of 60 feet per minute for the cutter and perforating roll. I have discovered that with the thin sheeted dough products of this invention, the peripheral velocity of the dockering points, if separately variable, can be controlled in relation to dough velocity to produce optimum perforation of the dough and positive release of the dough sheet from the dockering brush. Good results are obtained when the peripheral velocity of the dockering brush is from about 45% of the linear velocity of the dough sheet up to about 100% of the dough sheet velocity. Optimum results are produced when this relative velocity is in the 70% to 95% range. Further description of the use and advantages of the flexible brush dockering techniques is set forth in examples below.

EXAMPLES

The following Examples 1 through 6 describe the evolution in the development of the techniques for controlling the shape of the fried snack products according to principles of this invention. Example 3 and Examples 7 through 10 describe flexible brush dockering.

EXAMPLE 1

Sheeted potato snack products were made by a process using a hand-operated Rondo sheeter and a batch fryer.

Single Layer Product

A mixture of dry ingredients was prepared containing about 40% potato flakes, 10% potato granules, 37% raw potato starch, 10% ungelatinized fine corn flour, 1% sugar, 0.6% salt, 0.4% MSG, 1.0% liquid soybean oil, and 0.45% lecithin. 70 parts of water were added to 100 parts by weight of this dry mixture in a 12-quart Hobart mixer with paddle on low speed. After the water was absorbed, in about 15 seconds, the speed was increased to speed No. 2, and the mix continued for an additional 60 seconds. The dough was rolled to a thickness of about 1 mm (0.039 inch) between a set of sheeting rolls and then further reduced in thickness with a Rondo Model 1-500 hand-operated sheeter to about 0.9 mm (0.035 in.). This sheet was cut by hand into oval shapes about 2.75 inches (7.0 cm) long by 1.0 inch (2.54 cm) wide. The pieces were fried to completion in small batches at 350° F. for about 75 seconds. Analysis of this product, sample 1A, is shown in the table below. Because over 31% of the pieces contained bubbles or puffed areas over 12 mm (0.47 in.) in diameter, the product was not judged satisfactory.

A second product, sample 1B, was made by the same method, except that 5% of the potato flakes were replaced with ground dehydrated potato particulates to reduce puffing upon subsequent frying. Dehydrated diced potatoes measuring approximately 6 mm by 6 mm by 4 mm (0.24 in.×0.24 in.×0.16 in.) were produced by conventional means of cutting, blanching and drying as described in Potato Processing. Third Edition, published by Avi, Chapter 14. Unpeeled potatoes were used for the ingredient to enhance the flavor and appearance of the snack product. The dehydrated potatoes, abbreviated "UPD" for "un-peeled dice" were ground through a hammer mill to produce a product with the following screen analysis:

| Screen Size | Percent |
| --- | --- |
| 20 | 0 |
| 25 | 0.9 |
| 40 | 45.0 |
| 60 | 24.6 |
| 80 | 10.6 |
| 100 | 4.6 |
| 200 | 11.2 |
| −200 | 3.1 |

Previous experience had indicated that addition of this particulate to snack products reduced the tendency to puff during frying because the particles penetrated the surface of the sheeted snack and allowing steam to escape. Only 4% of the pieces in the finished product contained bubbles exceeding 12 mm (0.47 in.) diameter.

A third product, sample 1C, was made by the same method as sample 1A, except the potato flakes were replaced with 2.5% UPD and 2.5% of a dried potato peel ingredient recovered from the manufacture of potato granules in the final sifting operation. The final thickness of the sheeted dough was 1.10 mm (0.043 in.), which normally would cause a higher level of puffing than shown in sample IA. However, the puffing was satisfactorily reduced to only 5% of the pieces having bubbles measuring over 12 mm in diameter. The appearance of the finished product was untypically spotted by the peel fragments and would not be considered acceptable for commercial use.

Two Layer Product

A sheeted dough was made from the ingredients of Sample 1A as described below. A separate dark dough was produced from the same ingredients, except that the quantity of potato flakes was reduced by 10% and replaced by 5.0% UPD and 5% of a dried potato peel ingredient recovered from the manufacture of potato granules in the final sifting operation. The dough was colored a medium brown color by adding 0.75% of liquid caramel color. The cohesive light and dark doughs were sheeted separately in the Rondo to a thickness of 0.75 mm (0.03 in.), after which the dark dough was placed over the white dough and the combined thickness was reduced to 1.1 mm (0.043 in.). The bi-layered dough sheet was cut by hand into oval shapes as before and fried to completion to yield a product, sample 1D, having a tender, crisp texture and an earthly flavor resembling potato skins. However, 32% of the fried pieces had puffed areas exceeding 12 mm (0.47 in.) diameter. It was concluded that use of particulates to control puffing can be effective at least for single layer sheeted snack products. For two-layer products the dockering techniques described above produce the best results.

| Example 1 - Single Dough Layer with Particulates and Effect on Puffing | | | | |
|---|---|---|---|---|
| Sample | 1A | 1B | 1C | 1D |
| Layers | Single | Single | Single | Double |
| Particulates added as % of total dry ingredients: | | | | |
| UPD, % | None | 5 | 2.5 | 2.5(a) |
| Potato peel ingredient (percent) | 0 | 0 | 2.5 | 2.5(a) |
| Final dough thickness (mm) | 0.91 | 0.92 | 1.10 | 1.05 |
| Puffing > 12 mm (percent) | 31 | 4 | 5 | 32 |

(a) Added to dark dough only at 5% of total dark dough ingredients.

EXAMPLE 2

A continuous pilot plant for making bi-layered potato snacks was installed as follows. A first set of adjustable feed rolls placed light colored dough on the first section of a sheeting line conveyor. A second set of feed rolls placed a separate, darker colored dough on top of the lighter dough, and the two dough layers were conveyed under a second pair of sheeting rolls. The width of the combined dough sheets was approximately 14 inches (35.6 cm). The initially sheeted layers were then compressed in the first of two sets of reduction rollers. The final set of reduction rollers reduced the total dough thickness to within the desired 0.50 mm (0.02 in.) to 1.0 mm (0.039 in.) range. A rotary cutter mounted over the final conveyor cut the bi-layer dough into oval shapes. The unused dough web was then recovered with an overhead conveyor which transferred the web to a transverse collecting conveyor. The cut dough pieces were deposited on an optional conveyor having water spray nozzles above and below the belt that conveyed the pieces between the sheeting equipment and the fryer. The cut dough pieces dropped onto an input conveyor leading to a single stage fryer through which heated oil was circulated by a centrifugal pump. The dough pieces were not fried in a shallow depth of oil; in this experiment the dough pieces were fried in a conventional deep fat fryer. The fryer had an external electrically heated heat exchanger and an oil bypass by which the flow through the fryer pan could be adjusted. One or two adjustable speed paddles distributed the product uniformly across the width of the fryer. An adjustable speed submerger belt held the products beneath the oil surface for the remainder of the frying time. A final take-out belt conveyor deposited the fried samples in suitable containers.

Each of the feed rollers and reduction rollers could be separately controlled to the desired thickness, after which corresponding speed adjustments were made in the interconnecting conveyors. The speed of the final product conveyor leading to the fryer was normally maintained between about 18 and 40 feet per minute (5.49 and 12.2 m/min.); at about 31 feet per minute (9.45 m/min.) the line capacity was about 120 pounds per hour of fried product. The oil depth in the fryer was about three inches and the oil temperature at the inlet was 350° F. Two 18-inch wide rotating paddles distributed the dough pieces across the width of the fryer. The submerger belt length and speed produced a total frying time of about 65 seconds.

A mixture of dry ingredients for the light colored dough was prepared, and a separate mixture of dry ingredients for the darker colored dough was prepared The formulation for the lighter dough included about 38.3% potato flakes, 36.8% potato starch, 1% sugar, 0.6% salt, 0.4% MSG, 0.3% paste-type 40% monoglyceride emulsifier, 2.6% liquid soybean oil, and 20% ground cooked white corn, all expressed on a 10% moisture content basis. The ground cooked corn was prepared as follows. Dry corn was cooked for 40 minutes in a steam jacketed kettle with approximately 200% water based on the weight of corn. The corn was soaked overnight in excess water at 90° F., rinsed lightly, and ground in a Urschel Comitrol using a 0.010030 cutting head. Either yellow, white or combinations of both corn varieties were used. A purpose of using the corn solids in the dough was to provide sufficient discontinuity in the sheeted product to reduce puffing upon subsequent frying. Conventional lime treatment to remove hulls was not practiced when making the ground cooked corn described herein. 100 parts of the light dough formulation were added to 50 parts of water. The dark dough included 35.8% potato flakes, 10% ground dehydrated potatoes, 36.8% potato starch, 2.5% dried potato peels, 1% sugar, 0.6% salt, 0.4% MSG, 0.3% mulsifier, 2.6% soy oil, 1.5% liquid caramel color, 10% ground cooked corn, and 55% water relative to the dry mix.

The dry ingredients were blended in a ribbon blender until they were uniformly distributed. For the lighter dough, the ground corn, containing about 50% moisture, and water were added to the dry mix and mixed two minutes at slow speed with the flat paddle in a 60-quart Hobart mixer. For the dark dough the liquid caramel color was added to the water before adding to the dry mix; alternately, dry caramel color could be mixed with dry ingredients for the dark dough. The lighter dough was first sheeted to between 1.0 mm and 1.5 mm (0.039 and 0.07 in.), optimally 1.4 mm (0.055 in.), and deposited on the first conveyor. The dark dough was sheeted to between 1.0 mm and 1.6 mm (0.039 and 0.063 in.), optionally 1.3 mm (0.051 in.), and deposited on top of the light dough sheet.

The double layer was then reduced in thickness to approximately 1.0 mm to 1.3 mm (0.039 to 0.051 in.) through the first reduction rolls, and then from 0.85 mm to 1.10 mm (0.033 to 0.043 in.), normally 0.95 to 1.0 mm (0.037 to 0.039 in.), through the second reduction rolls. The recycled web was added at a fixed ratio to the dark dough, normally 35%, after first grinding it (in a Reitz hammermill fitted with sharp blades) into random pieces from approximately 0.2 inch (0.51 cm) to 1.0 inch (2.54 cm) in diameter. The recycled dough web was added to the dark dough during the last 30 seconds of mixing so that small portions of the lighter uncolored layer remained intact and exposed in the dark upper surface of the sheeted dough, producing a mottled appearance.

An experiment was conducted to determine techniques to controlling puffing of the product using a water spray to moisten both sides of the sheeted dough pieces before frying.

The ratio of the lighter dough thickness to the dark dough thickness also was varied to measure the effect on appearance of the finished product and additionally on puffing of the finished product.

Results of these experiments are tabulated in the Example 2 table below. In these experiments, the ratio of the light to dark dough is calculated as the original thickness of the sheeted light dough divided by the original thickness of the dark dough. Other product measurements included the thickness of the fried product measured at a point where no puffing occurred. The expansion of each piece upon frying is defined as the thickness of the finished product divided by the final thickness of the dough before frying. Objectionable puffing is defined as any piece having bubbles greater than 12 mm. Examination of pieces in which there are no bubbles greater than 6 mm (0.24 in.) affords a measurement of "good" quality. The fried products were subjected to a breakage test by dropping them 24 inches onto a rigid plastic surface. Texture and other quality attributes discussed herein are measured on a five point scale in which 1 is excellent, 2 good, 3 intermediate, 4 noticeably below standard for any reason, and 5 totally unacceptable.

In samples 2A through 2G the final dough thickness was increased from 0.62 mm to 1.27 mm (0.024 to 0.05 in.). Puffing increased drastically with any products over 0.9 mm, even with the water spray. Because the thinner products had a less desirable texture and were more difficult to sheet, it was concluded that water spraying was not a satisfactory method for controlling puffing in this process.

Products with a higher ratio of lighter dough to darker dough had an attractive light appearance on one side, but with thinner products the darker dough was not adequately dense to establish the desired color. It was concluded that a ratio of about 1.1 lighter dough to darker dough was optimum for the initial forming of the dough layers for the desired sheeted potato product. In production, this ratio would be restricted by the normal levels of dough web recycle (approximately 30% to 40%).

EXAMPLE 3

A series of tests were conducted in the pilot plant described in Example 2 to eliminate puffing during frying through the use of a flexible bristle dockering brush. For the following tests the dough formulation and frying procedure were the same as described in Example 2, except that the water spray unit was not used to moisten the surfaces of the cut dough pieces.

Test 3A. A 2.75 inch (7.0 cm) outer diameter polypropylene bristle brush was installed in the pilot plant described in Example 1 for use as a dockering device. The brush was located midway between the final sheeting rollers and the cutter so that the dough sheet was perforated with a number of small, barely discernible holes before cutting. The length of the bristles was about 0.9 inch (2.3 cm) measured from the point at which they emerged from the metal tape on the brush cylinder to the tip of each bristle. The diameter of each bristle was 0.018 inch (0.46 mm). The bristles were spread apart relatively uniformly by rotating the brush against a moving surface. The brush was rotated so that its point of contact with the dough sheet moved in the same direction as the traveling dough web. The brush had 140 bristles per linear inch of the metal tape and there were 32 turns per foot of the tape on the shaft, from which it was calculated that the density of bristles at the peripheral surface of the brush was about 141 bristles per square inch. The brush was mounted between two adjustable height bearings on opposite sides of the product conveyor. The brush was driven at the same speed as the conveyor by a rubber roller wheel installed on the same shaft. Considerable difficulty was encountered during this test because the dough sheet tended to wrap itself around the flexible bristles Test 3B. The brush described in test 3A was fitted with a separate independent variable speed drive. It was observed that the optimum rotational speed of the brush was different from the predicted speed established by the velocity of the dough sheet. It was observed that the velocity of the ends of the bristles, or the peripheral velocity, should be adjusted for varying conditions of dough consistency and also according to the velocity of the dough sheet on the final conveyor. For example, in making the product described in Example 2, optimum puncturing of the dough sheet and release of the dough from the bristles were obtained when the tip velocity of the bristles (in a direction parallel to the travel of the dough sheet) was 12% slower than the linear velocity of

| Example 2 - Effect of Water-Sprayed Dough Thickness Variables on Quality | | | | | | | | | |
|---|---|---|---|---|---|---|---|---|---|
| Sample | 2A | 2B | 2C | 2D | 2E | 2F | 2G | 2H | 2I |
| Dough Thickness, mm. | | | | | | | | | |
| Light dough | 1.39 | 1.39 | 1.39 | 1.32 | 1.32 | 1.32 | 1.32 | 1.62 | 1.79 |
| Dark dough | 0.95 | 0.95 | 0.95 | 1.22 | 1.22 | 1.22 | 1.22 | 1.22 | 1.22 |
| 1st reduction | 1.19 | 1.19 | 1.19 | 1.40 | 1.40 | 1.40 | 1.40 | 1.27 | 1.27 |
| Final reduction | 0.62 | 0.77 | 0.89 | 1.90 | 1.05 | 1.13 | 1.27 | 0.99 | 0.91 |
| Ratio light/dark | 1.46 | 1.46 | 1.46 | 1.08 | 1.08 | 1.08 | 1.08 | 1.33 | 1.47 |
| Product | | | | | | | | | |
| Thickness, mm. | 1.26 | 1.35 | 1.53 | 1.44 | 1.66 | 1.81 | 1.91 | 1.60 | 1.64 |
| Expansion | 2.00 | 1.75 | 1.72 | 1.62 | 1.58 | 1.60 | 1.50 | 1.62 | 1.80 |
| Fat, % | 28 | 23 | 28 | 23 | 24 | 27 | 24 | 27 | 24 |
| Puffing | | | | | | | | | |
| >12 mm., % | 2 | 1 | 18 | 12 | 68 | 67 | 69 | 32 | 9 |
| 6–12 mm., % | 33 | 36 | 51 | 44 | 6 | 0 | 0 | 19 | 29 |
| <6 mm., % | 65 | 63 | 31 | 44 | 26 | 33 | 31 | 49 | 62 |
| Breakage, % | 27 | 17 | 12 | 18 | 14 | 14 | 14 | 19 | 16 |
| Texture Score | 4 | 4 | 2 | 2 | 3 | 3 | 3 | 2 | 2 | the dough sheet. When the output velocity was increased by increasing the conveyor belt speed from 13.4 feet per minute (408.4 cm/min.) to 23.2 feet per minute (707;1 cm/min.), the rotational speed of the brush also changed to 10.5 rpm, or 20.3 feet per minute (6.19 m/min.), at the tip of the bristles, a 25% difference.

Test 3C. Various bristle materials and construction methods were studied in preparation for construction of a larger pilot plant dockering brush. Nylon bristles 1.30 inches (3.3 cm) long were obtained with diameters of 0.018, 0.020 and 0.022 inches (0.46, 0.51, 0.56 mm). The holes in the dough sheet made with 0.022 inch (0.56 mm) bristles were too obvious in the final product, and the longer 0.018 inch (0.46 mm) bristle was too flexible, so the 0.020 inch (0.51 mm) diameter bristle was chosen. The peripheral point density of the bristle points was reduced to 130 points per square inch (20.2 points per sq. cm), which was found sufficient to penetrate the dough sheet and produce final products in which 72% of the products had bubbles less than 6 mm (0.24 in.) in diameter, 28% bubbles 6 mm to 12 mm (0.47 in.) in diameter, and no bubbles over 12 mm diameter. Subsequent tests and adjustments made it possible to lower the 6 to 12 mm bubble count to between 10% and 20%, which was judged excellent quality for production. The dockering brush had an overall outer diameter of 7.55 inches (19.18 cm) and was operated at a peripheral velocity (in a direction parallel to the traveling dough sheet) 15% to 25% slower than the linear velocity of the dough sheet. The speed of the dough sheet was 60 feet per minute (18.3 m/min.).

Test 3D. A dockering brush useful for production of fried snack products was designed to produce results comparable to those produced with the pilot plant brush used in Test 3C. A production line was designed to produce a dough sheet 60 inches (152.4 cm) wide. A dockering brush having a diameter of 7.8 inches (19.8 cm) was used. A point density of 125 points per square inch (19.4 points/sq. cm) for the dockering brush was chosen to conform to the pilot plant operation. In subsequent pilot plant tests, it was found that with a point density less than about 80 points per square inch (12.4 points/sq.cm) too many large surface bubbles were present in the finished fried snacks. with a point density exceeding about 200 points per square inch (31.0 points/sq.cm), the dough sheet became torn or wrapped around the dockering brush due to the excess pressure required to force that many dockering points through the dough sheet and the additional force required to remove the dough sheet from that many bristles.

The dockering brush was constructed as follows. A ½ inch (1.27 cm) U-form galvanized metal tape was used for the production dockering brush. It was filled with a white nylon material (sold by DuPont under the tradename Tynex) having a diameter of 0.02 inch (0.51 mm), ±10% and HD crimped (deep crimped in a hank). Crimping improves the life of the material by absorbing a portion of the flex from the bristles during use. The brush was constructed with a fill of 11 gm of bristles per foot (0.361 gm/cm) of tape. For this material, this was equivalent to 100 bristles per lineal inch (39.37 bristles/cm) of the metal holding tape. This is the lightest possible fill with conventional brush forming equipment to prevent scissoring of the bristles and inconsistent fill. The tape machine was set to close the "U-form" holder as tightly as possible to flare the bristles during the brush formation.

The "U-form" brush was immediately wrapped at 24 turns per foot (0.787 turns/cm) on a 4.5 inch (11.43 cm) diameter mandrel, producing a cylinder diameter of 4.875 inches (12.38 cm). This wrap was tight and uniform to prevent creep or voids when the brush was placed in operation. The bristles were then turned to length by a scissor-type action, leaving a chisel point, which was later sanded with 120-160 grit emery cloth to round the ends and prevent or minimize dough sheet pick-up.

After forming, the brush was placed on bearing mounts on the sheeting line and trimmed to the cutter width on each end, using a dremel-type craft saw with a rotary speed of about 20,000 rpm. In spite of the tight wrap holding the bristles, some ridges of less density existed in the finished brush. It was found that a more uniform brush could be obtained by warming the rotating bristles using a quartz heater suspended approximately 3 inches (7.62 cm) above the tips of the bristles. The brush was lowered about ¼ inch (0.635 cm) below the point at which the bristles first touched the surface of the conveyor belt. The belt was then driven at a speed of about 15 to 20 feet per minute (457 to 610 cm/min.) for about one hour. The bristles were allowed to heat to facilitate their spreading action but were maintained at a temperature under 240° F., at which point they would start to soften or distort. The formed nylon bristles had an average length of 1.46 inches (3.71 cm) and an average diameter of 0.020 inch (0.051 cm).

In use it was found that the dockering brush should be mounted at a level that pre-flexes the bristles. That is, the brush was mounted so that the minimum spacing between the fixed inner ends of the bristles and the top surface of the dough sheet conveyor belt was less than the unflexed length of the bristles. This mounting of the brush applies a force to the outer periphery of the bristles which pre-flexes the bristles. Thus, the bristles are constantly in a flexed condition when contacting the moving dough sheet during the dockering step. In the following test, the dockering brush was lowered to a level 1/32 to 1/16 inch (0.8 to 1.6 mm) below the point where the tips of the bristles first touch the belt. The preflexed brush was then used to docker the dough sheet traveling on the belt. The brush was driven by a drive separate from the conveyor belt drive so that the speed of rotation of the brush could be adjusted relative to belt speed. The dockering brush was rotated in a direction that rotated the tips of the bristles in the same linear direction in which the dough was traveling at the locus of contact between the tips of the bristles and the dough sheet.

As the bristles and dough sheet met, the bristles entered the dough sheet at a slightly obtuse angle of about 115 from the horizontal axis. The sheet traveled slightly faster than the bristles, which drew the bristles in the direction of brush rotation, bent the bristles, and then caused them to rotate at their tips, as they continued to penetrate the sheet Since the bristles flex during contact with the moving dough sheet, they formed elongated holes in the dough sheet. The length of the holes was parallel to the direction in which the dough sheet traveled Although the dockering holes were elongated, they were barely discernible to the naked eye, and in the finished fried product they were barely noticeable. The dockering holes appear as small random dots or points in the finished product rather than larger holes in a definite pattern.

After the brush was put into operation, it was demonstrated that the flexible bristles at the bristle length of 1.46 inches (3.7 cm) and the 0.020 inch (0.51 mm) diameter produced good results when the dockered dough pieces were subsequently fried. The bristles had the proper stiffness to penetrate the dough sheet and eliminate blistering or bubbling of the finished fried product.

The random small discrete openings in the surface of the finished snack did not detract from the natural appearance of the snack. That is, they were not readily apparent and formed in a unique random pattern from chip to chip. Continuous operation for 24 hours per day for months of operation was accomplished with this dockering brush without problem; and good finished products with minimal bubbling were consistently produced. For other dough compositions, other brush stiffness factors such as length, diameter and material can be selected by those familiar with the art to accomplish similar dockering of the dough sheet. Examples 7 through 11 describe in more detail the improved results using the production dockering brush.

As to the method for calculating the number of bristles per square inch of peripheral brush surface for the pilot plant and production brushes, the following data are pertinent:

Mandrel = 4.5" = OD
Height of ¼" U-form tape after wrapping = 0.1875"
Mandrel + U-form tape = 4.875" = $D_1$
Bristle fill per ft. of tape = 11 gm = 100 bristles/inch = C
Wraps of tape per ft. of mandrel = 24 = T
Outside diameter of pilot plant brush = 7.48" = $D_2$
Outside diameter of production brush = 7.8" = $D_2$
Number of points per square inch of brush cylindrical area = N $$N = \frac{TD_1C}{12D_2}$$

Pilot Plant Brush
$N = \frac{24 \times 4.875 \times 100}{12 \times 7.48}$
$N = 130.3$ Production Brush
$N = \frac{24 \times 4.875 \times 100}{12 \times 7.8}$
$N = 125$

EXAMPLE 4

A number of experiments were conducted to improve the uniformity of curvature of the two layer potato snack in the pilot plant described in Example 2.

Test 4A. In the investigations described in Example 2, the dough pieces were fried in the single stage pilot plant fryer. The fryer was operated with an oil depth of about three inches. The dough pieces were oval in shape, about three inches long and about one inch wide. The pieces were dropped into the fryer from an input conveyor which extended about two inches over the inlet section of the fryer so that the dough pieces dropped directly into the oil as the oil was discharged from the manifold. The pieces were subject to the turbulent action of the oil as it entered the body of the fryer, causing the pieces to turn and rotate randomly in the oil. The pieces occasionally stuck together. Attempts were made to obtain a controlled degree of curvature in the finished fried pieces by changing the dough formulations or the relative moisture content of the dark and light dough fractions, but the quantity of curved finished pieces with the desired convexly curved dark side remained at only about 25% of the total fried pieces produced.

Test 4B. It was later observed that if the same dough pieces were introduced into the fryer at the oil surface, the steam would cause a greater percentage of the pieces would float for a short time on the surface of the oil. They were held up by the steam that accumulated from the rapid evolution of water from the underside of the pieces.

A test was conducted in the conventional fryer in which the oil depth was reduced from three inches to about 1.5 inches (3.8 cm). The adjustable stainless steel mesh feed conveyor was situated so the cut dough pieces were deposited inside the fryer near the surface of the oil. For this test, oil depth was reduced from three inches to about 1.5 inches. Oil velocity in the fryer was reduced to the minimum velocity that would prevent the pieces from coming into mutual contact in the fryer. Using this approach, the quantity of properly curved pieces increased to about 50% of the total fried pieces with the 1.5 inch oil depth.

Test 4C. The pilot plant fryer was equipped with an auxiliary free-float section as described above with reference to FIG. 6. The first stage of the free-float section was situated so that the discharge end of the shallow pan was positioned over the inlet end of the single stage fryer used in Tests 4A and 4B. The dough pieces were conveyed which discharged the pieces just above the surface of the oil. The velocity of the oil in the shallow pan was adjusted over a wide range to determine the optimum time for moving the pieces through the free-float section to obtain the desired product stiffness before the products were discharged into the second stage of the fryer.

The dough pieces were introduced into the free-float section of the fryer with the dark layer on top and the lighter layer on the bottom. The shallow depth of oil prevented the pieces from overturning in the fryer. Each piece fried to a convexly curved shape while floating freely in the shallow depth of oil. During this test it was found that after about 10 seconds the water removal had been sufficient to stiffen the curved pieces so that after they were discharged into the deeper second section of the fryer, no appreciable further shaping of the pieces occurred. By frying the dough pieces with the darker side on top, the steam collecting under the lighter side created a similar degree of curvature in the finished products. All fried pieces had substantially the same appearance-a convexly curved dark upper surface and a concavely curved light colored bottom surface. The natural appearance of the product was enhanced by snack dough pieces processed by this method, because all fried pieces did not assume exactly the same shape, as is the case when rigid molds are used to form fabricated potato chips.

Test 4D. To evaluate the various factors affecting product curvature, samples were separated into those with the "correct" shape, and those which remained flat, or were curved the wrong way, or were misshapen. The number of correctly curved pieces was expressed as a percentage of the total fried pieces.

Another method of evaluating product curvature was developed to define "curvature" so that various treatments could be evaluated more systematically. A convenient method was to measure the vertical distance that the concave side of the curved piece had raised above a straight line defined by points at opposite bottom edges of the piece. The maximum width of the piece usually determines the location of the points between which maximum curvature occurs. For example, for an oval piece this will generally be between the narrowest side edges. For a triangular piece this may be between the two points of minimum distance from each other, if the triangle is not equilateral, or in some cases between the tip of the triangle and the opposite base. The ratio of the maximum height of the curved section to the maximum width (the lateral distance between opposite curved edges of the piece) may be expressed as a ratio or percentage; in the examples that follow the curvature is expressed as the height divided by the width. Products are curved properly when a majority of the fried pieces in a given batch, at least 50%, but preferably over 70%, are curved substantially uniformly about a central axis so that the interior height of the concave portion divided by the distance between opposite edges of the product is about 0.060 to about 0.12.

Test 4E. Various shaped products were made from the potato dough described in Example 2 with results set forth in the Example 4 table below. It can be seen from the table that the degree of curvature was substantially similar whether the shape of the pieces was oval, round, hexagonal, triangular or rectangular. On the other hand, using the procedures of test 4B, it had not been possible to impart a random curvature to products other than the oval shaped products The degree of curvature varied with different formulations and particularly with the dough thickness and moisture content. Dough pieces with higher moisture content and thinner dough pieces both tended to distort more during frying. An important advantage of this process is that curvature is controllable so that similar shapes are produced but the shapes are sufficiently different from one fried piece to the next to give the appearance of randomly curved shapes. The convex side of the curved finished products is consistently formed by the darker top surface of the original dough pieces.

along with the two-stage float fryer described in Example 4C.

Test 5A. A ten cubic foot Marion mixer, model 6021, was obtained for pilot plant production of larger quantities of dough. The mixer was fitted with a 3600 rpm chopper to facilitate cutting and mixing the recycled dough web without requiring a hammer mill. A 250 pound batch of light colored dough was prepared by blending 125 pounds of blended dry mix with the ground yellow corn in the mixer without the chopper for 30 seconds at 50 rpm. While still mixing, 63.5 pounds of water were added and the mix continued until the dough was uniform, in about three more minutes. For the dark initial dough, 141 pounds of dry mix and 30 pounds of ground yellow corn and 812 grams of dry caramel were blended for 30 seconds with the paddles only. While still mixing, 78 pounds of water were added and the mix continued for an additional three minutes. After a period of operation sufficient web was accumulated for mixing with the next batch of dark dough. The mixer was charged with 56.5 pounds of dry mix, 12.2 pounds of yellow ground cooked corn and 85 pounds of dough web which were mixed 30 seconds with the chopper operating. While the mixing continued, 31.3 pounds of water were added and the mix continued for 2.5 minutes, after which the remaining 65 pounds of unground web were added and mixed an additional 30 seconds with the chopper. A sample of the dough was examined and it was found that the web had been broken up into pieces, the largest of which was about 0.75 inch (1.9 cm) in diameter. The sheeted dark dough had a desirable mottled appearance as the result of incorporating portions of the bi-layer dough during the final portion of mixing step. Pre-blends were made of the potato flake granules and other minor dry ingredients for the light dough and also for the dark dough, including a dry caramel color. The pre-mix was added to the remaining dry ingredients, emulsifier oil and ground corn in a Stephan mixer for 15 seconds, after which the water was added over a period of 30 seconds and the

Example 4 - Degree of Curvature

| Shape | Cut dimension | Average Height | Average Width | Percent Average Ratio | Good Curvature(a) |
|---|---|---|---|---|---|
| Small hexagon | 1¼" | 1.31 | 0.107 | 0.082 | 60 |
| Medium hexagon | 1⅞" | 1.88 | 0.101 | 0.054 | 71 |
| Large hexagon | 2⅜" | 1.88 | 0.184 | 0.098 | 81 |
| Small circles | 1⅜" | 1.719 | 0.129 | 0.075 | 75 |
| Regular circles | 1¾" | 1.726 | 0.109 | 0.063 | 74 |
| Large circles | 2¼" | 1.856 | 0.122 | 0.066 | 74 |
| Medium triangles | 1⅞" × 2¾" × 2¾" | 1.205 | 0.087 | 0.072 | 76 |
| Large triangles | 2⅜" × 2⅞" × 2⅞" | 1.842 | 0.144 | 0.078 | 100 |
| Small rectangles | 1.25" × 2"(b) | 1.058 | 0.098 | 0.093 | 76 |
| Regular rectangles | 1.5" × 2.5"(b) | 1.381 | 0.147 | 0.106 | 83 |
| Large rectangles | 2" × 3"(b) | 2.016 | 0.133 | 0.056 | 57 |
| Small ovals | 1" × 2⅜" | 0.981 | 0.121 | 0.123 |  |
| Medium ovals | 1 1/16" × 2⅝" | 1.120 | 0.102 | 0.091 | 88.5(c) |
| Large ovals | 1 3/16" × 3⅛" | 1.265 | 0.124 | 0.098 |  |
| S, M & L ovals (c) |  | 1.152 | 0.098 | 0.085 | 67 |
| S, M & L ovals (c) |  | 1.106 | 0.085 | 0.077 | 55 |
| S, M & L ovals (c) |  | 1.164 | 0.086 | 0.074 | 62 |

(a)Original evaluation method
(b)Approximate measurements of original hand-cut dough pieced before frying
(c)Combination of 50% large ovals, 25% medium ovals, 25% small ovals

EXAMPLE 5

The procedure of Example 2 was used for a number of tests of various processing variables. For these tests the dockering brush described in Example 3C was used mix continued another 30 seconds for a total mix time of 75 seconds. During mixing, the hand-operated stirring bar was rotated to remove particles of dough that stuck to the side of the bowl. The initial dark dough was mixed in exactly the same sequence. For the subsequent dark doughs, including 35% recycled dough web, the dry pre-mix, ground corn and one-half of the dough web were mixed in the Stephan mixer for 15 seconds, and the water was added during 30 seconds continued mixing, followed by an additional 20 seconds of mixing. The mixer was turned off, the remaining one-half of the web was added, and the mix continued for only an additional 10 seconds. The ratio of 35% web to 65% new dark ingredients is the quantity that was estimated would be useful for commercial production.

Test 5B. A 40 liter Stephan mixer equipped with a cutting blade mounted on a vertical shaft turning at 1800 rpm was used to prepare both the dark and light dough fractions described above in Test 5A.

It was found that mixing time was significant. For example, with a light dough containing about 43.5% moisture, extending the mixing time an additional 10 seconds created a dough which was adhesive and was difficult to remove from the sheeting rolls and the surfaces of the cutter. In addition, the product puffed excessively upon drying even though the dockering brush was used.

Test 5C. Using the procedure of test 5B, a formulation similar to Example 2 was tested with the moisture content of the dough adjusted to samples containing 39%, 41%, 43%, 45% and 47%. The results are tabulated below:

| Process Measurements | A | B | C | D | E |
|---|---|---|---|---|---|
| Calc. dough moisture | 39.0 | 41.0 | 43.0 | 45.0 | 47.0 |
| Fry time (seconds) | 47 | 58 | 64 | 68 | 70 |
| Dough type | 5/5.5 | 5/6 | 6/7 | 7/7 | 7/8 |
| Dockering brush speed (% difference from belt) | 0 | −7.0 | +2.7 | −8.1 | −22.7 |

The total frying time in this test was increased from 47 to 70 seconds to accommodate water removal to about 2% moisture content for each sample. The fat content and expansion of the finished product increased as the level of water in the dough increased. Samples containing 45% and 47% moisture puffed excessively even though the dockering brush was used. The consistency of the dough at 39% solids was dry and friable, which caused difficulty during sheeting. Because of the low moisture content the finished product had a harder texture. In contrast, the sample at the highest moisture level, 47%, had a very tender texture due to the higher fat content and expansion. It was noted that the highest moisture content was associated with a decrease in correctly curved pieces. The same observation had been made in earlier experiments, especially those conducted before installation of the shallow free-float fryer. The decrease in the number of properly curved pieces with higher moisture content can be associated with the increased flexibility of the dough which allows steam to escape from the pocket underneath the floating dough piece. Samples containing 41% to 43% moisture produced the best finished products.

Test 5D. The effect of holding time on the dough produced in test 5A was measured over a period of 60 minutes. This experiment was made with the frying conditions referred to in sample 4D, i.e. in which the products were introduced on the top surface of the oil but the oil was not restricted in depth. The percentage of good pieces in this case would normally be expected to range from about 40% to 60%. In this experiment, as the holding time was increased, the number of good curved pieces increased from 40% to 82% at 55 minutes.

EXAMPLE 6

A single layer corn and wheat-based snack was prepared to test a formulation to be used for a two-layer cereal-based snack. The single layer product contained the following ingredients, expressed on a 10% moisture basis by weight: ground cooked corn, 57%; pregelatinized corn flour, 14%; ground cooked wheat, 11%; amioca starch, 8.5%; ungelatinized corn flour, 5%; sugar, 2.5%; soybean oil, 1%; salt, 0.6%; and a paste-type 40% monoglyceride emulsifier, 0.3%. A 25 pound batch of dough was prepared by combining 22.8 pounds of the ground cooked corn at 52.6% moisture, 4.0 pounds of ground cooked wheat at 48% moisture, 6.7 pounds of the remaining blended dry ingredients in the proportions described above, and 1.5 pounds of water.

The ground cooked corn was prepared as follows. Conventional yellow snack-grade corn was cooked in boiling water for 35 minutes, then soaked in an excess of water at 90° F. for 16 hours. It was drained and ground through a 010030 Comitrol head and added to the formula. The cooked wheat was prepared by combining 5 pounds of hard red wheat with 10 pounds of water at about 140° F., heated to the boiling point and cooked 5 minutes. The wheat was then soaked an additional 30 minutes at 90° F. after 10 pounds cold water were added, and the mixture was drained and ground through the same Comitrol grinder.

Mixing was as follows. Emulsifier and oil were pre-blended with corn flours, salt and sugar, then other dry ingredients were added and mixed five minutes in a Planetary mixer. The cooked ground corn and wheat were added to the dry ingredients in a Stephan 40 liter mixer and mixed for 20 seconds. Water was added and mixing continued 40 seconds more. The dough was sheeted between two stainless steel rollers to a thickness of 2.3 mm (0.09 in.), then reduced to 1.5 mm (0.06 in.) in the first reduction roll, and finally to 1.0 mm (0.039 in.) in the final reduction roller. The sheeted product was dockered using the flexible bristle brush described in Example 3B, cut into oval shapes, and fried for 45 seconds in the two-stage float fryer. The product contained 28% fat and had 92% well curved pieces. However, the expansion ratio was only 1.5 to one and puffing was excessive. It was concluded that while the float frying technique could be used to make an acceptable single or bilayer cereal-based product with controlled curvature, the formulation required improvement to produce commercially acceptable snack products.

EXAMPLE 7

Using substantially the same formula and procedure as described in Example 5B to prepare a dough having a moisture content of about 42% by weight, the effects of variations in speed between the dockering brush and the dough sheet were measured. A double-layer product was tested. The dockering brush described in Example 3C was used.

Before beginning this test, the dockering brush bristles were pre-flexed by lowering the brush to a level where the bristles, if extended straight, would have been about 0.035 inch (0.9 mm) below the top surface of the dough conveyor belt. This setting of the brush was maintained throughout the tests in this example. The conveyor belt carrying the two-layer dough sheet through the dockering brush and cutter assembly was operated at a speed of 8.6 feet per minute (262.2 cm/min.). The peripheral speed of the brush was adjusted over a wide range and was expressed as a percentage of the belt speed, where brush speed was measured in a direction parallel to conveyor belt travel.

When brush speed was increased to a speed slightly greater than the speed of the dough sheet, the brush began to tear the dough sheet and dough pieces were picked up and carried over by the brush. As the speed of the brush was decreased relative to the speed of the dough sheet, the indentations of the bristle points became fewer but more obvious, until brush speed was reduced to about 50% of the dough speed. Below this speed, the dough sheet became wrinkled and exhibited a considerable number of torn enlarged holes.

During this test, samples of the dockered dough sheet were removed and examined to count the number of dockering holes in the surfaces of the dough pieces. This examination was made by exposing the dockered dough sheet to illumination from a lamp to facilitate counting the number of discrete holes penetrating the entire depth of the dough sheet. Such discrete holes cannot be seen with the naked eye without back lighting.

As the rotational speed of the dockering brush was decreased, the number of dockering holes per square inch in the top surface of the dough sheet also decreased. However, as brush speed was reduced relative to dough speed, the added flex of the bristles tended to form more elongated holes, and penetration through the dough sheet tended to increase. As a result, the number of completed holes in the finished products can be similar for a range of acceptable brush speeds.

The finished fried products were examined for bubble count to determine the amount of fried products having reduced bubbling or puffing within a commercially acceptable range. The amount of bubbling in the finished fried snacks was measured by a Bubble Index determined as follows. 100 grams of chips were divided into chips having only bubbles less than 6 mm in diameter (category A); chips having any bubbles within a range of 6 to 12 mm in diameter (category B); and chips having any bubbles more than 12 mm in diameter (category C). The chips within each category were weighed. The weight of chips within category A was multiplied by zero, the weight of chips within category B was multiplied by 0.5, and the weight of chips within category C was multiplied by 1.0. The resulting figures for the three categories were added to produce the total Bubble Index. Category C products are considered undesirable. However, a certain amount of bubbling produces good end products. Bubbling within the category B range is permissible and can be desirable. For instance, thin sheeted single layer products can have good crispness and texture if some bubbling is present. A Bubble Index of less than about 30 for a production sample of thin single layer chips is considered desirable. However, this index can vary with the product. A Bubble Index less than about 20 is desirable for the two-layer snacks.

The finished fried products also were examined for fat content and expansion ratio. Product expansion remained at about 1.66 to 1.75 throughout the test. Fat content varied from about 25% to 27%. It was concluded that the relation between dockering brush speed and dough speed for the workable range of relative speeds did not have a significant affect on expansion or fat content, both of which were within acceptable ranges in this test. As shown in the test results, Bubble Index did not change significantly over a wide range of brush speeds. Higher brush speeds can produce more dockering holes per unit of surface area of the dough, but as brush speed decreases, the greater flex of the bristles forms larger holes and produces better penetration. As a result, brush speed can be set within the limits of high speed and low speed operation which ensure smooth dockering of the dough sheet, and within those limits the resulting Bubble Index is generally acceptable.

In a separate test, the surface of the dockering brush was raised above the surface of the dough sheet. Without dockering, the number of chips having any bubbles over 12 mm diameter was 93% of the total; and the number of chips having any bubbles 6 to 12 mm in diameter was 7% of the total. Bubble Index was 97.

The appearance of the fried product changed considerably as dockering brush speed was decreased to about 64% of belt speed and below. Samples of finished fried products were graded on a five point scale, in which 1 is excellent, smooth appearance, 3 is the limit of acceptability, and 5 is the worst. As the brush speed was reduced, the dough sheet became extremely wrinkled and folds developed in the dough at about 50% to 55% of belt speed and below. In addition, the number of torn enlarged holes caused by the slowly rotating dockering brush points increased considerably. While some degree of wrinkling may be tolerated to produce a more natural appearance to the surface of the fried snacks, operation with an excessively low brush-to-dough relative speed becomes unacceptable because of the tendency of the dough to wrinkle and fold. If a wrinkled fried product is desirable, such a product can be produced by operating the brush at a speed of about 10% to 15% above the lower acceptable limit of brush speed. Of course, this range can vary from product to product and can be determined in relation to dough thickness, composition and moisture content.

It was concluded that the optimum relative speed of a brush for making a two-layer potato skin snack without any unacceptable surface wrinkling or tearing of the dough is between about 70% to 95% of dough sheet speed. It was concluded that these factors (avoiding wrinkling and tearing of the dough) control the acceptable relative speed of the dockering brush relative to belt speed more than other factors such as bubble count, fat content, or expansion of the finished products.

| Sample | Example 7 | | | | | |
| --- | --- | --- | --- | --- | --- | --- |
|  | A | B | C | D | E | F |
| Brush depth, inches | 0.035 | 0.035 | 0.035 | 0.035 | 0.035 | 0.035 |
| Dough thickness, mm | 1.02 | 1.02 | 1.03 | 1.03 | 1.09 | 1.09 |
| Brush speed as % of belt speed | 101 | 95 | 85 | 72 | 64 | 50 |
| Dockering holes, sq. in. | | | | | | |
| Top of dough sheet | 116 | 110 | 90 | 84 | 52 | 45 |
| Bottom of dough sheet | 97 | 77 | 77 | 71 | 45 | 32 |
| Top of fried snack | 85 | 104 | 86 | 73 | 78 | 37 |
| Bottom of fried snack | 53 | 52 | 58 | 43 | 50 | 28 |
| Bubble index | 10 | 13 | 17 | 13 | 3 | 8 |
| Appearance score | 1 | 1 | 1 | 1 | 2 | 4 |
| Ease of sheeting | 3 | 2 | 1 | 1 | 1 | 1 |

EXAMPLE 8

The procedure described in Example 7 was repeated to measure the effect of the height of the dockering brush tips relative to the dough sheet. At the beginning of the test, the brush was lowered to a level of operation where the bristle tips would have been 0.035 inch (0.9 mm) below the top surface of the conveyor belt. As the brush height was adjusted, measurements were made of the distance between a fixed point on the conveyor support and the bottom of the rotating shaft. These were then converted into the brush depth measurements described in Table 8.

The brush was raised slightly so that brush depth was reduced to 0.01 inch (0.25 mm). A larger number of undesired bubbles were noted in the finished product. The brush was then lowered gradually for a series of tests made at brush depths from 0.035 inch (0.9 mm) to 0.135 inch (3.4 mm). This latter depth of penetration produced the maximum amount of pressure that could be applied to the brush to flex the bristles as they encountered the dough sheet. It was concluded that operation with greater brush depths would create excessive wear of the brush.

The fried product was examined over a source of illumination to count the number and judge the appearance of the small holes formed by the dockering brush. Table 8 shows the number of holes in the top and bottom surfaces of the fried products and the Bubble Index for 100 gram samples of the finished products. Optimum results were obtained with brush height in the range of 0.06 inch (0.15 mm) to 0.135 inch. Generally, the amount of dockered holes that penetrated entirely through the dough were directly related to a reduction in the Bubble Index. Since the number of discrete holes increase with a certain level of pressure applied to the dough sheet by the brush, producing a corresponding reduction in the Bubble Index, it was concluded that operation with a certain level of brush pressure is desirable for these types of products.

It has been determined that the best procedure for operating the flexible dockering brush is to first determine the desired depth of penetration to achieve optimum reduction of bubble size in the finished product This setting can be made depending upon dough characteristics such as dough thickness, composition and moisture content. Once the optimum reduction in the Bubble Index is produced, the desired relative brush-to-belt speed is then set to prevent tearing (at high speeds) and to avoid wrinkling of the dough (at low speeds). Relative speed settings between these limits do not significantly affect bubble size or other quality measurements in the finished products.

| SAMPLE | Example 8 | | | | | |
|---|---|---|---|---|---|---|
| | A | B | C | D | E | F |
| Brush depth$^a$, inches | 0.010 | 0.035 | 0.060 | 0.085 | 0.135 | 0.135 |
| Dough thickness, mm | .81 | .81 | .74 | .74 | .76 | .79 |
| Dockering holes/sq. in. | | | | | | |
| Top of fried snack | 97 | 77 | 97 | 90 | 71 | 90 |
| Bottom of fried snack | 32 | 39 | 65 | 71 | 58 | 71 |
| Bubble Index | 49 | 44 | 23 | 19 | 21 | 28 |

$^a$The distance the brush tips are lowered below the surface of the belt supporting the dough sheet.

EXAMPLE 9

A single layer sheeted potato snack was made from a dry mixture of potato ingredients having the following approximate formulation: Potato flakes-36%; potato granules 13%; ground dehydrated potatoes-7.5%; potato starch-37%; vegetable oil-3%; paste-type monoglyceride emulsifier-0.3%; the balance being various flavoring ingredients including sugar, salt, MSG, etc. The potato flakes were blended with the oil, emulsifier, and minor ingredients in a 60-quart Hobart mixer and then the other dry ingredients were added and mixed 5 minutes. Water was added to the dry mix and mixing continued for 2 minutes on speed 2 with the paddle blade to prepare a dough with a moisture content of about 42% by weight.

The friable potato mixture was fed to a set of 6.5-inch (2.56 cm) diameter, 12-inch (4.72 cm) wide, stainless steel sheeting rolls, after which the sheeted dough was conveyed through the flexible bristle dockering brush and cutting system. The dockered dough sheet was cut into hexagon shapes using a polyethylene cutter with a spacing of about 2 inches (5.08 cm) between opposite parallel sides. The dockered and cut pieces were then fried to completion at 350° F. in the single stage continuous fryer described in Example 4A. The dockering brush was set at the same level as in Example 7.

The effect of variation of the dockering brush speed was measured with the dough sheet first sheeted to about 0.70 mm (0.028 in.) thickness and later to a thickness between 0.95 and 1.00 mm (0.037 to 0.039 in.).

As noted in Example 7, operation of the brush with a peripheral speed maintained at about the same speed as the dough sheet, or slightly above, was limited by the tendency of the dough sheet to tear apart and stick to the brush. By slowing the dockering brush (relative to belt speed) by controlling the separate drive for the brush, the bristles flexed during perforation of the dough sheet so that the sheet released from the bristles with little or no sticking. As the speed of the brush was progressively reduced, the force on the dough sheet from the slowly moving bristles eventually caused the sheet to wrinkle to a degree which finally became impractical.

Table 9 summarizes the measurements made during the experiment and the effects on the quality of the finished product. There were no measurable differences caused by the variation in dockering speed on fat content, expansion and bulk density of the finished product. The Bubble Index for the thin sheet product was higher than for the thicker product. During this test, the dockering brush had been raised slightly to avoid tearing the fragile dough of the thinner sheeted product, which resulted in fewer dockering points penetrating the dough sheet.

From the results of this experiment, and particularly because of the wrinkled appearance of the product at the slowest speed and the tendency of the dough sheet to tear and adhere to the brush at faster speeds, it was concluded that for sheeted potato products the practical lower limit of dockering brush speed was about 60% of belt speed for thin products and 50% for thicker products, and up to a maximum of about 106% of the brush speed for both dough thicknesses. Optimum limits for product quality and machine operation are from about 70% to 95% of belt speed, similar to the results of Example 7. As in Example 7, brush speed also can be maintained at about 10% to about 15% above the lower acceptable limit of brush speed to form an intentionally wrinkled product. Thus, good products can generally be produced when brush speed is in the range from about 50% up to about 100% of dough speed.

During this test the belt speed was maintained at 8.1 feet per minute (246.9 cm/min.) for the thinner dough

| Sample | Example 9 Sheeted Potato Snack | | | | | | | | | |
|---|---|---|---|---|---|---|---|---|---|---|
| | A1 | A2 | A3 | A4 | A5 | B1 | B2 | B3 | B4 | B5 |
| Brush speed as % of belt speed | 0 | 26.7 | 41.9 | 62.8 | 105.9 | 0 | 31.3 | 51.8 | 75.9 | 102.4 |
| Sticking to brush | — | 1 | 1 | 1 | 4 | — | 1 | 1 | 1 | 3 |
| Dockering point holes | | | | | | | | | | |
| before frying-top, #/sq in | 0 | 30 | 39 | 57 | 86 | 0 | 34 | 58 | 72 | 89 |
| after frying-top, #/sq in | 0 | 19 | 32 | 55 | 84 | 0 | 36 | 52 | 74 | 106 |
| after frying-bottom, #/sq in | 0 | 17 | 21 | 35 | 60 | 0 | 21 | 34 | 34 | 23 |
| Appearance: | | | | | | | | | | |
| wrinkled surface | — | 4 | 3 | 1 | 1 | — | 5 | 4 | 1 | 1 |
| torn, enlarged holes | — | 4 | 3 | 1 | 1 | — | 4 | 3 | 1 | 1 |
| Bubble Index | 100 | 30 | 15 | 20 | 16 | 100 | 2 | 4 | 0 | 13 |

Note:
1 = best; 3 = limit of acceptability; 5 = worst

EXAMPLE 10

A non-limed ground cooked corn ingredient was made from dry yellow corn as described in Example 2. The cooked corn was soaked overnight in 90° F. water, drained and ground through the Comitrol using the 1030 head. The approximate formulation contained 64% ground cooked corn (calculated on a 10% moisture basis), 15% pregelatinized corn flour, 15% amioca corn starch, 10% potato flakes and 0.6% salt. The moisture content of the ground gelatinized corn was 50% and the moisture of the dough was 49%. The ingredients were mixed in a HObart VCM 40-liter mixer fitted with sharp cutting blade impeller. The dry ingredients were mixed with the corn for 15 seconds, water was added, and mixing was continued for an additional 45 seconds on low speed.

The dough was sheeted to produce a single layer dough, and the effects of dockering were tested for thin and thicker single layer products. The dough was sheeted through a single set of 6.5 inch (16.5 cm) diameter stainless rollers set to produce a 0.9 mm (0.035 in.) dough thickness in one sample and 0.75 mm (0.03 in.) thickness in a second sample. The dough sheet was and 8.3 feet per minute (253 cm/min.) for the thicker dough sheet. The brush speed was varied between the ranges described in Examples 7 and 9, from the fastest speed at which the brush could be operated without tearing and wrapping the dough sheet around the brush, to the slowest speed where wrinkling of the dough sheet made further operation impractical. Results of these tests are shown in Table 10.

Variations in the speed of the dockering brush had substantially no effect on product expansion, fat content, bulk density and breakage Extreme wrinkling of the dough sheet was noted at each thickness as the brush approached the minimum speed. Wrinkling was more pronounced than with potato snacks under the same conditions. As the speed of the brush was increased and approached the speed of the dough sheet, the degree of puffing was reduced because of additional holes penetrating through the dough sheet. In general, the corn snack was more difficult to make than potato-based snacks because of dough stickiness. It was concluded that the optimum range for sheeted corn snacks made with the flexible dockering brush was at a relative speed from about 70% to about 95% of dough sheet speed.

| Sample | Example 10 | | | | | | | | | |
|---|---|---|---|---|---|---|---|---|---|---|
| | Thin Chips | | | | | Thick Chips | | | | |
| | B1 | B2 | B3 | B4 | B5 | C1 | C2 | C3 | C4 | C5 |
| Brush speed as % of belt speed | 0 | 42.0 | 63.0 | 86.4 | 101.3 | 0 | 41.2 | 69.9 | 83.1 | 100 |
| Sticking to brush | — | 1 | 1 | 1 | 4 | — | 1 | 1 | 1 | 3 |
| Dockering point holes | | | | | | | | | | |
| before frying-top, #/sq in | 0 | 72 | 62 | 74 | 88 | 0 | 65 | 57 | 79 | 94 |
| after frying-top, #/sq in | 0 | 36 | 58 | 66 | 70 | 0 | 35 | 48 | 62 | 52 |
| after frying-bottom #/sq in | 0 | 29 | 40 | 57 | 55 | 0 | 26 | 21 | 27 | 44 |
| Appearance: | | | | | | | | | | |
| wrinkled surface | — | $5^a$ | 3 | 1 | 1 | — | $5^a$ | 4 | 1 | 1 |
| torn, enlarged holes | — | $5^a$ | 4 | 1 | 3 | — | $5^a$ | 4 | 1 | 2 |
| Bubble Index | 91 | 23 | 21 | 9 | 12 | 93 | 18 | $53^b$ | $39^b$ | $23^b$ |

Note:
1 = best; 3 = limit of acceptability; 5 = worst
$^a$More prounounced than in potato snacks in Example 9
$^b$Fewer holes in fried product due to stickiness of dough dockered with the nylon brush described in Example 3C set at the brush depth described in Example 7. The sheet dough was cut into equilateral triangles with sides approximately 2 inches long. The cut dough pieces were fried continuously at 350° F. for about 60 seconds and were later evaluated for quality.

EXAMPLE 11

A potato-based dough similar to that described in the previous examples was sheeted to a final dough thickness of 0.7 mm and dockered by the flexible bristle dockering brush set at a brush depth of 0.06 inch. Results of the test demonstrated that best dockering brush operation occurred at a brush speed of 94% of the dough speed. Good product results were also obtained for brush speeds lower than 94% and for brush speeds up to about 100% of dough speed. The dough began to wrinkle at 85% of dough speed, but the wrinkles were barely perceptible in the finished product. Wrinkles were visible in the finished products when the dough was dockered at a brush speed of 60%. The wrinkles were small amplitude undulations extruding essentially parallel to each other across the width of the fried piece The undulations were best visible when the finished product was viewed in cross-section Brush operation could not be sustained at speeds below about 40%. It was concluded that good intentionally wrinkled products could be produced for this thin sheeted single layer product at brush speeds in the 50% to 60% range. The Bubble Index was well within the acceptable range. Better intentionally wrinkled products were produced for thin sheeted single layer products than for the thicker double layer products A wrinkled product can have improved crispness and texture when compared with some products which are not wrinkled.

Thus, use of the flexible dockering brush makes it possible to avoid unacceptable puffing or bubbling when frying thin sheeted dough pieces (generally in the range of 0.6 mm to about 1.2 mm) with a high moisture content (generally in the range of about 35% to about 60% by weight) having a combination of gelatinized and ungelatinized starch contained in the dough at the time of frying. Frying such a dough piece without dockering consistently produces unacceptable bubbling in nearly all of the fried products. Acceptable finished products can be consistently produced with the flexible dockering brush in at least 95% of the finished products. This improvement can be achieved without moisture treatment before frying or other prior art dockering techniques. Improvements also are produced when compared with dockering using rollers with rigid dockering spikes or pins. Use of the flexible dockering brush has shown that bubbling is reduced in proportion to the point density (holes per area of sheeted dough) of completed holes formed in the dough by the dockering brush (when the brush is used within the practical limits for the distance between the brush and conveyor belt and for brush speed versus belt speed). The bubble count in finished products is acceptable for single and double-layer products and for corn and potato-based dough products The necessity of using the flexible dockering brush is more critical when producing thin single-layer fried snacks. Flexible brush dockering also produces commercially acceptable fried snacks which are deep-fat fried entirely, i.e., without initial frying in the shallow depth float-frying method.

Use of the flexible dockering brush also has a number of processing advantages over use of the dockering roll with rigid dockering pins. The flexible bristles can be pre-flexed to bend during dockering and apply a pre-set pressure to the dough sheet. The usable length of rigid dockering pins is limited to not greater than the distance from the roll to the belt surface. Since the flexible bristles can be longer and can bend while dockering, this has an advantage of producing a longer locus of contact with the dough sheet, thereby forming elongated dockering holes which allow the bristles to release better from the dough and thereby avoid the dough sticking to the brush or otherwise deforming the dough. A greater density of dockering points also can be used on the flexible dockering brush compared with rigid dockering pins. The use of rigid dockering pins at greater point densities can create problems of sticking and deformation of the dough sheet. Because of the greater point density made possible with the flexible dockering brush, depth of penetration is improved, producing more dockering holes per unit area of sheeted dough. Since the greater point density of completed holes produces a related reduction in bubbling, the flexible dockering brush is highly effective in producing acceptable finished products.

Other advantages of the flexible dockering brush include producing a random pattern of dockering holes in the finished products and the capability of producing an intentionally wrinkled finished product. Operation of the dockering brush at speeds within certain limits can, in combination, produce necessary dockering to control surface bubble formation and to obtain a wrinkled appearance in the finished product. Examples herein shown that a point density in the range of about 80 to about 200 holes per square inch produces acceptable finished products with minimal bubbling, while permitting the dockering brush to be operated smoothly on the sheeted product. Point densities lower than about 80 holes per square inch can produce too many bubbles in the finished product. Point densities greater than about 200 points per square inch can cause too much wrapping of the dough on the bristles of the dockering brush. The range can vary depending upon dough composition, thickness and moisture content.

Inasmuch as baked starch-containing dough products are also dockered prior to heat-treatment to reduce puffing, it is believed that the flexible dockering brush of this invention also can be used for baked products. One advantage is that the dockering holes can be less apparent and have a random hole pattern in the finished product which is unique from piece to piece.

The present invention also provides a process for controlling the shape of a fried snack product in which a continuous dough layer is sheeted and cut into spaced apart rows of thin, flat dough pieces then fried in a continuous process. In one embodiment, the dough pieces are fried in the shallow depth of oil which is maintained at a flow rate that causes the dough pieces to travel through the oil in rows while separating the products to avoid contact between products in each row. The shallow oil depth prevents the dough pieces from overturning in the oil while they fry sufficiently to impart the final set shape to the pieces. The dough pieces entering the shallow depth of oil continue their travel under the surface of the oil until sufficient heat has been transferred to the pieces to begin evaporation of the water. Normally this requires about two or three seconds. The rapid escape of steam during this brief immersion of the dough pieces causes the pieces to rise to the surface of the oil. Any tendency of the submerged pieces to turn over in the shallow depth of oil is prevented by the bottom of the shallow pan which stabilizes the pieces in the oil and maintains the upper surfaces of the dough pieces facing upwardly in the shallow oil depth. There is no physical contact with any portion of the fryer during this brief immersion in the oil. As the evolution of steam begins, as a result of the rapid transfer of heat into the dough piece and evaporation of water, the steam bubbles under each piece raise it to the surface where it floats on the surface while additional steam bubbles collect under the dough piece This exerts an upward force that creates the curved shape of the final product. The oil flow rate in the first section is maintained essentially laminar, i.e., oil flow is smooth without any significant turbulence that would otherwise disrupt the continuous flow of properly oriented and properly separated products through the fryer. The oil flow rate and required residence time of the pieces in the oil determine the length of the float section of the fryer. The pieces are fried in the float section for a sufficient length of time to stiffen them in their pre-set shape. Oil flow rate also is controlled to prevent crowding of the pieces as they travel through the first stage of the fryer. The products float freely on the surface of the shallow oil depth in rows to the second stage of the fryer where frying is completed by frying the pieces, submerged, in a greater depth of frying oil.

What is claimed is:

1. A method for controlling puffing of a starch-containing snack food product during cooking where the product is made from a dough piece formed as a thin sheet, comprising dockering the dough sheet with a brush formed of flexible bristles and then cooking the dockered dough sheet, the density of said bristles being from about 80 to about 200 bristles per square inch of brush surface, the flexible bristles being flexed while within the dough sheet to form oblated conical perforations in the dough sheet to allow for sufficient escape of steam during subsequent cooking and thereby avoid puffing in the cooked product.

2. The method according to claim 1 in which the dockering brush has elongated flexible radially extending bristles, the tips of which are rotated into contact with the dough sheet, the angle defined by the bristles and the planar surface of the dough being approximately 115°.

3. The method according to claim 1 in which the perforations produced by the dockering brush in the dough sheet are in a random pattern and have a point density less than the point density of the bristles on the brush.

4. The method according to claim 1 in which the peripheral velocity of the bristles at their point of contact with the dough sheet is different from the linear velocity of the dough sheet.

5. The method according to claim 4 in which the peripheral velocity of the bristles is lower than the linear velocity of the dough sheet.

6. The method according to claim 1 in which the dockered dough sheet is fried at a moisture content from about 35% to about 60%, by weight of the dough.

7. The method according to claim 6 in which the dough sheet, at the time of frying, contains a combination of gelatinized and ungelatinized starch.

8. The method according to claim 7 in which the dough sheet has a thickness in the range of about 0.6 mm to about 1.2 mm when fried.

9. The method according to claim 7 in which the dough piece is made from dehydrated potato solids and/or ground cooked corn.

10. The method according to claim 1 in which the dockering brush is operated at a speed in the range from about 50% up to about 100% of dough speed during the dockering step.

11. The method according to claim 1 in which at least about 20 of said perforations per square inch extend entirely through the dough sheet.

12. A method for controlling puffing of a fried snack food product made from a dough formed as a thin sheet and fried, in which the dough at the time of frying has a moisture content of about 35% to about 60% by weight, and in which the dough contains a combination of gelatinized and ungelatinized starch when fried, comprising dockering the thin dough sheet with a rotating dockering brush having from about 80 to about 200 randomly oriented flexible bristles per square inch of brush surface projecting radially from a roll, the flexible bristles flexing within the dough sheet such that oblated conical perforations are formed through the dough sheet, and then frying the dockered dough sheet in hot cooking oil to produce a finished fired snack having substantially no surface bubbling when compared with a similar fried snack not dockered prior to frying.

13. The method according to claim 12 in which the dough sheet has a point density of perforations sufficient to substantially prevent formation of bubbles greater than 12 mm in size in the finished product.

14. The method according to claim 12 in which the peripheral velocity of the bristles is lower than the linear velocity of the dough sheet.

15. The method according to claim 12 in which the dough sheet is made from dehydrated potato solids and/or ground cooked corn.

16. The method according to claim 12 in which at least about 20 of said perforations per square inch extend entirely through the dough sheet.

17. A method for making a fired food product from a thin dough sheet dockered with small dockering holes before frying, comprising the steps of dockering the dough sheet with a flexible bristle brush having a bristle tip point density from about 80 to about 200 points per square inch, flexing said bristles within the dough sheet to form oblated conical perforations and then frying the dockered dough sheet to produce a finished fried snack product essentially free of surface bubble formation.

18. The method according to claim 17 in which the fried snack product contains a combination of gelatinized starch and ungelatinized starch at the time of frying and is fried at a thickness in the range of about 0.6 mm to about 1.2 mm.

19. The method according to claim 18 in which the snack product is essentially free of surface bubbles greater in size than about 12 mm.

20. The method according to claim 17 in which the point density of completed holes in the finished product is greater than at least about 20 holes per square inch.

* * * * *